United States Patent
Oikawa et al.

[11] Patent Number: 6,150,004
[45] Date of Patent: Nov. 21, 2000

[54] ANTIMICROBIAL LAMINATE AND BAG, CONTAINER, AND SHAPED CUP USING SAME

[75] Inventors: Takuji Oikawa; Youichi Fukushima; Kenichi Ishii; Mariko Takesue; Yumiko Muto; Ko Fujii; Satoshi Fukaya, all of Tokyo, Japan

[73] Assignee: Kyodo Printing Co., Ltd., Tokyo, Japan

[21] Appl. No.: 08/787,254

[22] Filed: Jan. 24, 1997

Related U.S. Application Data

[63] Continuation of application No. 08/401,005, Mar. 9, 1995, abandoned.

[30] Foreign Application Priority Data

Jul. 14, 1994 [JP] Japan ................................. 6-185400
Jan. 7, 1995 [JP] Japan ................................. 7-16470

[51] Int. Cl.[7] ................................................... B32B 3/26
[52] U.S. Cl. .................. 428/141; 428/304.4; 428/317.1; 428/318.4; 428/532
[58] Field of Search .............................. 428/304.4, 305.5, 428/310.5, 317.1, 318.4, 141, 532, 480

[56] References Cited

U.S. PATENT DOCUMENTS

| | | |
|---|---|---|
| 3,932,693 | 1/1976 | Shaw . |
| 5,236,713 | 8/1993 | Wato et al. ............................ 424/443 |
| 5,417,974 | 5/1995 | Sekiyama et al. ....................... 424/411 |

FOREIGN PATENT DOCUMENTS

| | | |
|---|---|---|
| 4-79869 | 6/1992 | Japan . |
| 4-179464 | 10/1992 | Japan . |
| 6-158002 | 6/1994 | Japan . |
| 6-92842 | 7/1994 | Japan . |
| 07024048 | 1/1995 | Japan . |

*Primary Examiner*—Elizabeth M. Cole
*Attorney, Agent, or Firm*—Snider & Associates; Ronald R. Snider

[57] ABSTRACT

An antimicrobial laminate excelling in the ability to effect gradual release of an antimicrobial agent and providing an antimicrobial action evenly and bags and other containers using the antimicrobial laminate are disclosed. A substratal film 24 impervious to steam is provided on one side of a substratal film proper 22 of paper with a gas-barriering layer 23 of aluminum foil. An antimicrobial film 21a pervious to steam is formed by sequentially superposing an adhesive agent layer (AITC regenerating layer) 16a containing an AITC inclusion cyclodextrin compound 15 (fine powder), a steam-pervious film 17a having a fine powder of silica gel dispersed therein, an adhesive agent layer 16b identical in construction with the adhesive agent layer 16a, and a sealant material 17b of steam-pervious film in the order mentioned. An antimicrobial layer 121 is constructed by adhesively superposing the substratal film 24 and the antimicrobial film 21a through the medium of the adhesive agent layer 16a. A bag is constructed by folding the laminate with the sealant material 17b on the inner side and attaching a fastener of ridge-groove engagement to the mouth of the bag.

9 Claims, 13 Drawing Sheets

FIG. 9

| DAY(S) | 0 | 1 | 2 | 3 | 4 | 5 | 6 | 7 | ---- |
|---|---|---|---|---|---|---|---|---|---|
| TEST EXAMPLE 1 K-PET/PE FILM BAG | UNCHANGED ||||||||| 
| PE FILM BAG | UNCHANGED ||| GROWTH AND BREEDING OF MOLD |||||
| COMPARATIVE EXAMPLE 1 | UNCHANGED || GROWTH AND BREEDING OF MOLD |||||||

FIG. 20

| DAY(S) | 0 | 1 | 2 | 3 | 4 | 5 | 6 | 7 | ... |
|---|---|---|---|---|---|---|---|---|---|
| TEST EXAMPLE 2 | UNCHANGED | | | | | | | | |
| COMPARATIVE EXAMPLE 2 / K-PET/PE FILM BAG | UNCHANGED | | | | | GROWTH AND BREEDING OF MOLD | | | |
| COMPARATIVE EXAMPLE 3 / PE FILM BAG | UNCHANGED | | | | GROWTH AND BREEDING OF MOLD | | | | |

ANTIMICROBIAL LAMINATE AND BAG, CONTAINER, AND SHAPED CUP USING SAME

This application is a continuation, of application Ser. No. 08/401,005, filed Mar. 9, 1995, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records but otherwise reserves all copyright rights whatsoever.

BACKGROUND OF THE INVENTION

1. Field of the Invention

This invention relates to an antimicrobial laminate containing an allylisothiocyanate (AITC) inclusion cyclodextrin compound and an antimicrobial bag, an antimicrobial container, and an antimicrobial shaped cup using the laminate.

2. Description of the Prior Art

Bags made of polyethylene film and furnished with a fastener have been heretofore used as wrapping materials for storage and distribution of such perishable foodstuffs as meat and vegetables. These bags merely serve the purpose of shielding the foodstuffs from the ambience and have the drawback that they exhibit no antimicrobial ability.

As a solution for this problem, an antimicrobial film incorporating therein an antimicrobially active substance such as, for example, silver zeolite particles has been finding utility. This antimicrobial film is aimed at preserving the freshness of a given perishable article of food by abating the growth of putrefying microbes adhering to the food or adhering to or suspended inside a refrigerator.

The aforementioned antimicrobial film incorporating silver zeolite particles therein is produced by kneading a synthetic resin material with silver zeolite particles and molding the resultant blend in the form of film. This film produces an antimicrobial action on the food wrapped therewith when the water on the surface of the food contacts the film and induces exudation of the silver ion of the silver zeolite from the film and the silver ion thus liberated adheres to the surface of the food. Thus, the film exerts the antimicrobial action exclusively on the part of the food which is kept in contact with the film. This film, therefore, has the drawback that when the food is in the form of a solid mass, the antimicrobial effect of this film tends to lack evenness.

As one measure to eliminate this drawback, the idea of blending AITC with a synthetic resin material and molding the resultant mixture in the form of film thereby obtaining an antimicrobial film may be conceived.

The AITC is at an advantage in gasifying without requiring the film to contact water, exuding from the film and mingling with the atmosphere enveloping the food, and consequently producing an antimicrobial action evenly on the food. It nevertheless has the drawback that since the exudation of AITC proceeds fairly quickly, the film lacks the ability to release the AITC gradually and consequently fails to produce a lasting antimicrobial action and tends to entrain wasteful release of AITC.

Further, since the AITC boils at 151° C. and remains in a liquid state at normal room temperature, it is not easily incorporated in a film which is generally molded at elevated temperatures exceeding 200° C.

SUMMARY OF THE INVENTION

This invention has been produced in association with the drawbacks of the prior art described above. It is an object of this invention, therefore, to provide an antimicrobial laminate excelling in the ability to release gradually an antimicrobial agent, permitting production of an even antimicrobial action, and advantageously serving the purpose of preserving particularly the freshness of foodstuffs, and bags, containers, and shaped cups using the laminate.

The present invention has solved the problems attendant on the prior art as described above by utilizing the including action (the quality of containing various molecules in an empty framework) of cyclodextrin, a cyclic oligosaccharide and producing an AITC inclusion cyclodextrin compound which is capable of gradually releasing AITC by means of gasification.

The first aspect of this invention resides in an antimicrobial laminate (film or sheet; similarly applicable hereinafter) which is characterized by having a substratal film impervious to steam and a film pervious to steam superposed through the medium of an intermediate layer containing an allylisothiocyanate (AITC) inclusion cyclodextrin compound.

The second aspect of this invention resides in an antimicrobial laminate which is in accordance with the first aspect of this invention and characterized in that the film pervious to steam possesses permeability to steam (JIS [Japanese Industrial Standard] Z 0208) in the range of from 5 to 40 $g/m^2 \cdot 24$ hr.

JAPANESE INDUSTRIAL STANDARD

Testing Methods for Determination of the Water Vapour Transmission Rate of Moisture-Proof Packaging Materials (Dish Method) JIS Z 0208-1976

1. Scope

This Japanese Industrial Standard specifies the method using the water vapour transmission dish for testing the water vapour transmission rate of the moisture-proof packaging materials such as plastic film, converted paper and the like.

2. Definition

The water vapour transmission rate is the quantity of vapour passing through the unit area of filmy substance for the definite hour. In this standard, when constituting the boundary surface by the moisture-proof packaging materials at the temperature of 25° C. or 40° C., and keeping the air of one side at a relative humidity of 90% and the air of the other side at the dry state by moisture absorbent, the value having converted the mass (g) passing through this boundary surface for 24 h into the value per 1 $m^2$ shall be defined as the water vapour transmission rate.

Because the affects of temperature and humidity on the water vapour transmission rate are not simple, the rate having been estimated from the measured value under the temperature and the humidity condition different from the testing condition as specified in this standard cannot be regarded as the water vapour transmission rate termed in this standard.

3. Apparatus 3.1 Water Vapour Transmission Dish

The water vapour transmission dish, hereinafter referred to as the "dish", shall meet the following conditions.

An example of the dish and its accessories is shown in FIG. 28 and FIG. 29.

(1) The area of water vapour transmission shall be not less than 25 cm² and be capable of specifying its area clearly. The area of water vapour transmission shall be calculated from the inner diameter of the ring.

(2) The quality of material shall have no permeability for the vapour and produce no corrosion and the like under the testing condition.

(3) The dish shall have enough rigidity not to be transformed during operation.

(4) The peripheral part of test piece shall be sealed completely.

See FIG. 28 and FIG. 29 (1)–(6) for a view of an example of water vapour transmission dish and its accessories (unit: mm).

| Number | Name | Remark |
| --- | --- | --- |
| 1 | Ring | Aluminium material, treated by anodic oxidation vapour |
| 2 | Dish | Dish made from glass and others, and of light weight |
| 3 | Cup | Aluminium material, treated by anodic oxidation vapour |
| 4 | Guide | Guide made of brass casting or the like |
| 5 | Cup Base | Base made of brass casting or the like |
| 6 | Weight | About 500 g in mass of brass casting or the like |

3.2 Cover

Where the use of cover is required [see (10) in '6.J, its cover shall be one capable of covering the one side of test piece completely and it is advisable that its material is same as that of cup.

3.3 Thermo-Hygrostat

The thermo-hygrostat shall be one in which the air kept at the specified temperature and humidity can circulate at a velocity of 0.5 to 2.5 m/s above the test piece. The temperature and humidity conditions at the time of test shall be as follows:

|  | Temperature | Relative Humidity |
| --- | --- | --- |
| Condition A | 25 ± 0.5° C. | 90 ± 2% |
| Condition B | 40 ± 0.5° C. | 90 ± 2% |

3.4 Chemical Balance

The chemical balance shall be capable of weighing the mass of cup to 0.1 mg.

4. Chemical Agents 4.1 Moisture Absorbent

The moisture absorbent shall be as specified in JIS K 8123. The absorbent having a grain size passing through the sieve of nominal size 2380 pm as specified in JIS Z 8801 and remaining on the 590 pm sieve shall be used.

4.2 Sealing Waxes

Use the sealing waxes meeting the following conditions. Further, it is preferable that the filler and the in soluble solid component are not included.

(1) It shall be difficult to be peeled off and easy to be operated to seal with wax.

(2) It shall be not fragile at room temperature and have no water absorption, nor hygroscopic property, nor fear of oxidation.

(3) It is required that the sealing waxes are not softened and deformed when being exposed under the temperature and humidity. condition B and the change in the mass of not less than 1 mg in 24 h is not produced, where its exposed surface area is 50 cm².

Remark: The following are examples of compounding (in mass ratio) of sealing waxes.

(a) Microcrystalline wax 60% and refined crystal paraffin wax 40%

(b) Paraffine wax 80% having a melting point of 50 to 52° C. and viscous polyisobutylene (one having a low polymerization) 20%

(c) Mixture of waxes having oil of 1.5 to 3 Z at a melting point of 60 to 75° C.

5. Test Piece

Take the test piece with sufficient cares to represent its sample, cut off not less than three test pieces, which have circular shape having a diameter larger by about 10 mm than the inner diameter of the cup to be used, from the same sample to offer the test.

Where the discrimination of the both top and bottom sides of test specimen is clear, the direction of the side of test piece can be kept constant according to the use of that material when fitting the test piece with the cup. When measuring on the both sides, prepare not less than three test pieces on each side.

6. Operation

Where the cup as shown in Attached Figure is used, fit the test piece with the cup by the following operation and carry out the test. Where other cup is used, carry out the test operation corresponding thereto.

(1) Cleanse the cup and after having dried it, warm it up to a temperature of about 30 to 40° C.

(2) Put the dish containing moisture absorbent in the cup and place it on the cup base kept horizontally. At this time, keep the surface of moisture absorbent horizontal as far as possible so that the distance from the underside of test piece will become about 3 mm.

(3) Put the test piece on the position to become concentric with the cup.

(4) Cover the guide to fit with the groove of cup base.

(5) Push the ring in as shown in Attached Figure until the test piece will contact closely with the upper edge of cup to fit the guide and put the weight on it.

(6) Draw the guide perpendicularly up with cares not to move the ring to remove it.

(7) While rotating the cup horizontally, flow the melted sealing waxes (I) into the groove at the peripheral part of the cup and seal the edge of the test piece. At this time, take cares not to produce cracks, bubbles and others.

(8) Remove the weight and the cup base after the sealing waxes has been solidified. Clean the sealing waxes that have been stuck to the part except the sealing part (sides and bottom of the cup and others) by the cloth with a suitable solvent soaked to remove and take as test specimen.

(9) Put the test specimen in the thermo-hygrostat kept at the specified test condition.

(10) After having placed the test specimen in the thermo-hygrostat not less than 16 h, take it out of the apparatus, let it keep balance with room temperature and measure the mass by the chemical balance. Where the side exposed to the outside of the test piece is the material having a large hygroscopic property, cover the test specimen immediately after taking it out of the thermo-hygrostat apparatus to lessen the change of moisture content as far as possible (2)

(11) Put the test specimen in the thermo-hygrostat again, take the cup out at a suitable time interval, repeat the weighing operation and measure the increase of the mass of cup. Obtain the mass increases per unit hour of consequtive two weighings respectively, continue this test until it will become constant within 5%.

The time interval of the weighings shall be 24, 48 or 96 h and its increase in mass shall be at least not less than 5 mg.

Moreover, it is necessary to complete the test before the moisture absorbent put in the cup has absorbed a moisture of 10% to its mass.

(12) Where the water vapour transmission rate of sample is small or where the sample has a hygroscopic property, produce not less than two blank cups without the moisture absorbent by the same operation, add this to the test specimens to conduct the test similarly and it Is desirable to correct the increased mass of test specimen at each time interval by the mean value of the mass change of the blank cup.

Notes (1) The temperature of melted sealing wax shall not be the temperature likely to impair the measurement such as the part corresponding to the water vapour transmission area will melt or shrink.

(2) Where the test piece includes materials such as paper, paper-boards cellophane and the like has been exposed to the other direction, the use of cover is required.

7. Calculation

Obtain the water vapour transmission rate from the following formula on each test specimen and round off it to two significant figures as specified in JIS Z 8401.

$$(g/m^2 * 24h) = \frac{240 \times m}{t * s}$$

where s: area of the water vapour transmission (cm$^2$)

t: total of time intervals between the last two weighings (h)

m: total of increased masses between the last two weighings (mg)

8. Report

Report the test results on the mean value, the minimum value and the maximum value, the number of measured values and the temperature and humidity conditions (the classification of A and B) of the used atmosphere as the water vapour transmission rate (g/m$^2$·24 h) according to JIS Z 0208 and append particulars if there are the following items:

(1) The distinction of direction of the test piece when fitted to the cup.

(2) Where the test has been made after having treated the test piece preliminarily.

The third aspect of this invention resides in an antimicrobial laminate which is in accordance with the first or second aspect of this invention and characterized in that the intermediate layer is an adhesive agent layer containing an AITC inclusion cyclodextrin compound.

The fourth aspect of this invention resides in an antimicrobial laminate which is in accordance with the first or second aspect of this invention and characterized in that the intermediate layer is in the form of an anchor coating agent layer containing an AITC inclusion cyclodextrin compound and the substratal film and the film pervious to steam are superposed by the extrusion laminating technique through the medium of the anchor coating agent layer.

The fifth aspect of this invention resides in an antimicrobial laminate which is in accordance with any of the first, second, third and fourth aspect of this invention and characterized in that the substratal film is provided on one side thereof with a gas-barriering layer and the intermediate layer is interposed between the gas-barriering layer and the film pervious to steam.

The sixth aspect of this invention resides in an antimicrobial laminate which in accordance with any of the first, second, third, fourth and fifth aspect and characterized in that the film pervious to steam has numerous minute pores formed therein in the direction of thickness of the film to the middle part of the thickness from the surface.

The seventh aspect of this invention resides in an antimicrobial bag which is characterized by comprising a bag proper obtained by folding the antimicrobial laminate set forth in any of the first through sixth aspect with the steam-pervious film on the inner side and a ridge-groove fastener attached to the mouth of the bag proper for insertion and removal of food in such a manner as to seal the bag proper openably.

The eighth aspect of this invention resides in an antimicrobial container which is characterized by constituting itself a steam-impervious container consisting of a container proper and a detachable lid capable of tightly sealing the container proper and having the antimicrobial laminate set forth in any of the first through sixth aspect applied to the inner side of either or both of the lid and the container proper with the steam-pervious film on the inner side.

The ninth aspect of this invention resides in an antimicrobial shaped cup which is characterized by constituting itself a steam-impervious cup consisting of a cup proper made mainly of plastic and an easy-peel lid fused to a flange part of the cup proper and the lid being formed of the antimicrobial laminate set forth in any of the first through sixth aspect and possessed of a steam-pervious film of a hotmelt adhesive resin or an easy-peel resin.

The tenth aspect of this invention resides in an antimicrobial laminate which is characterized by having superposed a substratal film impervious to steam and an antimicrobial film provided with an allylisothio-cyanate (AITC) regenerating layer containing an AITC inclusion cyclodextrin compound and the antimicrobial film being formed by alternately superposing AITC regenerating layers and films pervious to steam and consequently provided with two or more AITC regenerating layers.

The eleventh aspect of this invention resides in an antimicrobial laminate which is in accordance with the tenth aspect of this invention and characterized in that the permeability to steam of the steam-pervious film (JIS Z 0208) is in the range of from 5 to 40 g/m$^2$·24 hr.

The twelfth aspect of this invention resides in an antimicrobial laminate which is in accordance with the tenth or eleventh aspect characterized in that the outermost layer on the side opposite the substratal film is formed of the the steam-pervious film and all the AITC regenerating layers are each formed of an adhesive agent layer containing an AITC inclusion cyclodextrin compound.

The thirteenth aspect of this invention resides in an antimicrobial laminate which is in accordance with the tenth or eleventh aspect of this invention and characterized in that the AITC regenerating layer is in the form of an anchor coating agent layer containing an AITC inclusion cyclodextrin compound and the substratal film and the film pervious to steam are superposed by the extrusion laminating technique through the medium of the anchor coating agent layer.

The fourteenth aspect of this invention resides in an antimicrobial laminate which is in accordance with any of the tenth through thirteenth aspects and characterized in that the substratal film is provided on one side thereof with a gas-barriering layer and the AITC regenerating layer is interposed between the gas-barriering layer and the film pervious to steam.

The fifteenth aspect of this invention resides in an antimicrobial laminate which is in accordance with the twelfth aspect of this invention and characterized in that the film pervious to steam superposed in the outermost layer on the side opposite the substratal film has numerous minute pores formed therein in the direction of thickness of the film to the middle part of the thickness from the surface.

The sixteenth aspect of this invention resides in an antimicrobial laminate which is characterized by having superposed a substratal film impervious to steam and an antimicrobial film provided with an allylisothio-cyanate (AITC) regenerating layer containing an AITC inclusion cyclodextrin compound and the antimicrobial film being formed by interposing between two vertically opposed AITC regenerating layers a steam-pervious film having a hygroscopic powder dispersed therein.

The seventeenth aspect of this invention resides in an antimicrobial laminate which is in accordance with the sixteenth aspect of this invention and characterized in that the permeability to steam of the steam-pervious film (JIS Z 0208) is in the range of from 5 to 40 g/m$^2$·24 hr.

The eighteenth aspect of this invention resides in an antimicrobial laminate which is in accordance with the sixteenth or seventeenth aspect of this invention and characterized in that the substratal film is provided on one side thereof with a gas barrier layer, the AITC regenerating layer is used as an adhesive layer, the antimicrobial film is formed by sequentially superposing an AITC regenerating layer, a steam-pervious film having a hygroscopic powder dispersed thereon, an AITC regenerating layer, and a steam-pervious film containing no hygroscopic powder (sealant material) in the order mentioned, and the gas barriering layer of the substratal film and the AITC regenerating layer of the antimicrobial film are superposed.

The ninteenth aspect of this invention resides in an antimicrobial bag which is characterized by comprising a bag proper obtained by folding the antimicrobial laminate set forth in any of tenth through eighteenth aspects hereof with the steam-pervious film on the inner side and a ridge-groove fastener attached to the mouth of the bag proper for insertion and removal of food in such a manner as to seal the bag proper openably.

The twentith aspect of this invention resides in an antimicrobial container which is characterized by constituting itself a steam-impervious container consisting of a container proper and a detachable lid capable of tightly sealing the container proper and having the antimicrobial laminate set forth in any of the tenth through fifteenth aspects applied to the inner side of either or both of the lid and the container proper with the side thereof opposite the substratal film on the inner side of the container.

The 21st aspect of this invention resides in an antimicrobial shaped cup which is characterized by constituting itself a steam-impervious cup consisting of a cup proper made mainly of plastic and an easy-peel lid fused to a flange part of the cup proper and the lid being formed of the antimicrobial laminate set forth in any of the tenth through fifteenth aspects of this invention and possessed of a steam-pervious film of a hotmelt adhesive resin or an easy-peel resin.

The 22nd aspect of this invention resides in an antimicrobial shaped cup which is characterized by constituting itself a steam-impervious cup consisting of a cup proper made mainly of plastic and an easy-peel lid fused to a flange part of the cup proper and the lid being formed of the antimicrobial laminate set forth in any of the sixteenth through eighhtennth aspects of this invention and having the steam-pervious film in the outermost layer on the side opposite the substratal film formed of a hotmelt adhesive resin or an easy-peel resin.

BRIEF DESCRIPTION OF THE DRAWINGS

This invention will be better understood and the objects, features, and advantages thereof other than those set forth above will become apparent when consideration is given to the following detailed description thereof, which makes reference to the annexed drawings wherein:

FIG. 9 is an explanatory diagram showing the results of Test Example 1 of this invention and Comparative Example 1.

FIG. 20 is an explanatory diagram showing the results of Test Example 2 of this invention and Comparative Examples 2 and 3.

DETAILED DESCRIPTION OF THE PREFERRED EMBODIMENTS

Figure 1:
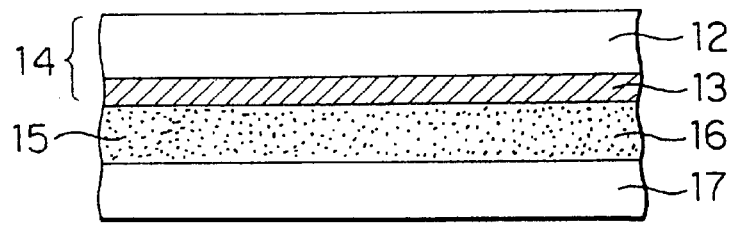
FIG. 1 is a schematic cross section showing an example of the antimicrobial laminate of this invention.

The antimicrobial laminates which are set forth in the first through sixth aspects and the tenth through eightennth aspects are cut in suitable sizes and used for wrapping foodstuffs or they are used as component members for the antimicrobial bags, antimicrobial containers, or antimicrobial shaped cups to be used for wrapping or preserving foodstuffs as set forth in the seventh through ninth aspects and ninteenth through 22nd aspects. They are invariably used in such a manner that the substratal film thereof may fall outside and the antimicrobial film on the side exposed to a foodstuff contained therein.

When either a foodstuff containing water or a foodstuff having water adhering to the surface thereof is not contained, the antimicrobial laminates neither manifest an antimicrobial action nor incur consumption of the inclusion compound because the regeneration of the AITC from the inclusion compound due to water does not occur. When the foodstuff mentioned above is contained, the antimicrobial laminates produce the antimicrobial action stably for a long time because the water from the foodstuff penetrates the steam-pervious film and infiltrates the AITC regenerating layer, dissolves the cyclodextrin of the inclusion compound and consequently induces regeneration of the AITC from the inclusion compound, and allows the AITC to penetrate the steam-pervious film and gradually depart in a gasified state toward the foodstuff.

Then, the antimicrobial laminates which are set forth in the first through sixth aspects do not suffer excessive release by gasification of the AITC from the inclusion compound because the steam-impervious substrate film is formed on the side opposite the side contacting the contained foodstuff and, as a result, the intermediate layer is not infiltrated with the steam in the ambient air or with water drops from outside. The antimicrobial laminates, therefore, excel in the ability to release the AITC gradually and permit effective utilization of the antimicrobial action.

The antimicrobial laminates which are set forth in the first, third, and fourth aspects may suffer early consumption of the AITC and fail to produce the antimicrobial action for a sufficiently long time when the permeability of the steam-pervious film to steam is unduly high or they may produce the antimicrobial action for an unduly long time and fail to use up the AITC within a given span of time when the permeability to steam is unduly low.

The antimicrobial laminate which is set forth in the second aspect permits the release by gasification of the AITC from the inclusion compound to proceed at a proper speed ensures utilization of the inclusion compound without any waste because the permeability of the steam-pervious film to steam is confined within a stated range.

The antimicrobial laminate which is set forth in the fifth aspect has the substratal film provided with a gas barriering-layer (having low permeability to gas). It precludes wasteful release of the AITC into the ambient air because the ambient air does not easily permeate the laminate toward the foodstuff contained therein and the steam in the ambient air mingles with the foodstuff only at a lower rate. Further, it exalts the ratio of utility of the inclusion compound because it precludes the dispersion of the AITC into the ambient air through the medium of the substrate film.

In the antimicrobial laminate which is set forth in the sixth aspect, the parts of minute pores in the steam-pervious film have a small wall thickness and allow the release by gasification of the AITC to proceed at a high speed as compared with the other parts. This antimicrobial laminate, therefore, can be adapted for the expected period of preservation of a given foodstuff by suitably setting the diameter and the number of the minute pores mentioned above.

When the antimicrobial laminate is used for wrapping a foodstuff having water drops adhering to the surface thereof, the entrance of water drops into the minute pores can be prevented and the quick release of the AITC can be avoided by sufficiently decreasing the diameter of the minute pores as compared with the size of water drops. Further, this laminate permits the speed of release of the AITC to be heightened as compared with the laminate which is not provided with minute pores.

The antimicrobial bag which is set forth in the seventh aspect is allowed to produce the action inherent in the antimicrobial laminate which is set forth in any of the first through sixth aspect of this invention. Since this bag is rendered openable and closable by means of a ridge-groove fastener provided at the mouth of the bag proper for insertion of a foodstuff, the foodstuff can be easily inserted into and extracted from the bag proper. It excels in the ability to retain the freshness of the foodstuff contained therein because it permits the user to remove part of the foodstuff from the bag proper and thereafter shield the remaining foodstuff in the bag proper against the ambient air by sealing the mouth of the bag proper with the fastener.

Further, since this antimicrobial bag is provided on the side thereof exposed to the open air with the steam-pervious substratal film, it induces neither spontaneous release by gasification of the AITC nor degradation of the antimicrobial action by aging even when the bag is left standing in its empty state in the open air. It manifests the antimicrobial action only when it contains a wet foodstuff.

The antimicrobial container which is set forth in the eightennth aspect is allowed to produce the action inherent in the antimicrobial laminate set forth in any of the first though sixth aspects of this invention. Then, it manifests a high ability to retain the freshness of a foodstuff similarly to the bag set forth in the seventh aspect because it is capable of shielding the interior thereof against the ambient air by means of a lid.

The antimicrobial shaped cup which is set forth in the ninth aspect permits a foodstuff contained in the cup proper to be sealed by having the lid fused to the cup proper through the medium of a steam-pervious film such as of hotmelt adhesive resin or easy-peel resin.

The shaped cup which has been sealed as described above, therefore, produces the same action as is obtained by the antimicrobial container set forth in the eighth aspect of this invention because the steam-pervious film falls on the side contacting the foodstuff and the steam-impervious substratal film on the side exposed to the open air.

The antimicrobial film forming the antimicrobial laminate which is set forth in any of the tenth through fifteenth aspects is produced by alternately superposing AITC regenerating layers and films pervious to steam and consequently provided with two or more AITC regenerating layers preeminently excels in the ability to release AITC gradually, the part having mainly the AITC regenerated therein sequentially migrates from the nearer side to the farther side of the film relative to the foodstuff contained therein.

In cases where the antimicrobial film is provided with two AITC regenerating layers, for example, the migration mainly takes place in the AITC regenerating layer closer to the foodstuff during the initial through the intermediate stage of the AITC regeneration. From the intermediate stage forward of the AITC regeneration, the regeneration of the AITC occurs mainly in the substratal film side of the AITC regenerating layer because the inclusion compound remains in an ample amount in the AITC regenerating layer farther from the foodstuff (on the substratal film side) while the amount of the inclusion compound remaining in the AITC regenerating layer on the side closer to the foodstuff.

Then, the antimicrobial laminate which is set forth in the sixteenth through eighteenth aspect continues to manifest the antimicrobial action for such a long period as several months or more because the antimicrobial film is formed by interposing between two vertically opposed AITC regenerating layers a steam-pervious film having such a hygroscopic powder as silica gel dispersed therein.

Figure 17:
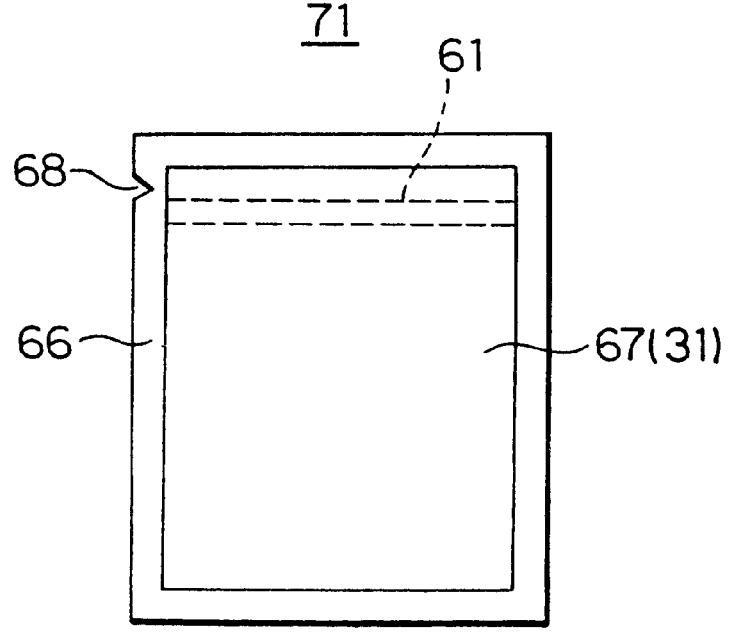
FIG. 17 is a schematic plan view showing an example of the antimicrobial bag of this invention.

An antimicrobial laminate 201 which has a substratal film 14, an AITC regenerating layer 16, and a steam-pervious film 17 sequentially superposed in the order mentioned as shown in FIG. 17 exhibits an excellent ability to release the AITC gradually when a given foodstuff has a relatively small amount of water adhering thereto. When the amount of water so adhering is large, the antimicrobial laminate 201 does not easily retain the antimicrobial action for a long time because a large amount of water quickly permeates the steam-pervious film 17 and infiltrates the AITC regenerating layer 16 and the amount of AITC regenerated from the inclusion compound and the AITC is consumed in a large amount quickly. The period of the retention of the antimicrobial action is generally in the range of from one to two weeks.

In contrast to the antimicrobial laminate 201 described above, the antimicrobial laminates which are set forth in the sixteenth through eighteenth aspects, (1) when the water from the foodstuff infiltrates the antimicrobial laminate piecemeal for a long time, the regeneration of the AITC from the AITC regenerating layer on the outer side (the substratal film side) does not substantially occur because for a certain period following the start of the infiltration of water, part of the water infiltrates the AITC regenerating layer on the inner side (the foodstuff side) and induces gradual regeneration of the AITC and most of the remaining water is absorbed y the hygroscopic powder in the steam-pervious film.

Thereafter, when the regeneration of the AITC from the AITC regenerating layer on the inner side approximates its termination and, at the same time, the hygroscopic powder dispersed in the steam-pervious film has absorbed moisture to saturation, the AITC regeneration mainly occurs from the AITC regenerating layer on the outer side because virtually all the water infiltrating the antimicrobial laminate enters the AITC regenerating layer on the outer side.

Then, (2) when a relatively large amount of water quickly infiltrates the antimicrobial laminates, the amount of the water infiltrating the AITC regenerating layer on the outer side is small and the amount of the AITC regenerated from the AITC regenerating layer on the outer side is very small as compared with that from the AITC regenerating layer on the inner side because part of the water infiltrates the AITC regenerating layer on the inner side and most of the remaining water is absorbed by the hygroscopic powder in the steam-pervious film.

As the regeneration of the AITC from the AITC regenerating layer on the inner side has practically ceased, the amount of water infiltrating the antimicrobial laminate from the foodstuff has decreased, and the hygroscopic powder in the steam-pervious film has absorbed moisture to a state of saturation, part of the water which has infiltrated the AITC regenerating layer on the inner side permeates the steam-pervious film and infiltrates the AITC regenerating layer on the outer side and activates the regeneration of the AITC from this AITC regenerating layer.

The antimicrobial laminate which is set forth in the sixteenth through eighteenth aspects, as described above, excel particularly in the ability to release the AITC gradually when a relatively large amount of water quickly infiltrates this laminate because the steam-pervious film containing the hygroscopic powder functions as what may be called a moisture permeation adjusting layer (layer for adjusting the amount of permeating water), the AITC regeneration in the former half of the period occurs mainly in the AITC regenerating layer on the inner side, and the AITC regeneration in the latter half of the period occurs mainly in the AITC regenerating layer on the outer side.

For the antimicrobial laminates which are set forth in the tenth through fifteenth aspects, such factors as the number of AITC regenerating layers, the amount of the inclusion cyclodextrin compound to be added, and the thickness and the material (in connection with the permeability to steam) of the steam-pervious film are set in consideration of the period required for the retention of antimicrobial ability, the level of antimicrobial ability, the temperature and humidity conditions under which the antimicrobial film is used, the amount of water contained in or adhering to a foodstuff to be wrapped with the antimicrobial film, or the like.

In cases where a relatively low antimicrobial ability is desired to be retained for a long time, for example, it is both desirable and economical to increase the number of AITC regenerating layers and, at the same time, set the amount of the inclusion compound incorporated in each of the component layers at a rather low level.

For the antimicrobial laminates which are set forth in the sixteenth through eighteenth aspects, the amount of the inclusion cyclodextrin compound to be added to the AITC regenerating layer and the thickness and the material (in connection with the permeability to steam) of the steam-pervious film having a hygroscopic powder dispersed therein or the like are set in consideration of the period required for the retention of antimicrobial ability, the level of antimicrobial ability, the temperature and humidity conditions under which the antimicrobial film is used, the amount of water contained in or adhering to a foodstuff to be wrapped with the antimicrobial film, or the like.

In cases where the antimicrobial ability is desired to be retained for a still longer period, it is both desirable and economical to form the antimicrobial film by superposing a plurality of laminates having the steam-pervious film interposed between two vertically opposed AITC regenerating layers and, at the same time, set the amount of the inclusion cyclodextrin compound incorporated in each AITC regenerating layer at a rather low level.

For the fixed amount of the inclusion cyclodextrin compound, comparison between the antimicrobial laminate provided with one AITC regenerating layer of a large wall thickness and the antimicrobial laminates having a plurality of AITC regenerating layers of a small wall thickness superposed through the medium of a steam-permeable film as set forth in the tenth through fiteenth aspects reveals that the latter laminates are superior to the former laminate in terms of the ability to release the AITC gradually, though they show no difference in the amount of AITC to be regenerated.

For the fixed amount of the inclusion cyclodextrin compound, comparison between the antimicrobial laminate of the construction provided with one AITC regenerating layer as shown in FIG. 1 and the antimicrobial laminates having superposed through the medium of an AITC regenerating layer two hygroscopic powder-dispersed steam-pervious films as set forth in the sixteenth through eighteenth aspects reveals that the latter laminates are far superior to the former laminate in terms of the ability to release the AITC gradually, though they show no difference in the total amount of AITC to be regenerated.

Then, in the antimicrobial laminates which are set forth in the tenth through eighteenth aspects, the possibility of the AITC being released by gasification from the inclusion compound is nil because the steam-impervious substratal film is disposed on the side opposite the side contacting the foodstuff and enabled to prevent the AITC regenerating layer from being infiltrated with the steam in the ambient air or the water drops from the ambience. Thus, the antimicrobial laminates of this invention excel in the ability to release the AITC gradually and enjoy effective use of the antimicrobial action of the AITC.

Incidentally, the AITC which is the acronym for allyl isothiocyanate is a volatile liquid compound which is one of the components of horseradish and harmless to men and beasts and inimical to microbes.

The antimicrobial laminates which are set forth in the tenth and sixteenth aspects suffer early consumption of the AITC and fail to produce the antimicrobial action for a sufficient time when the permeability to steam of the steam-pervious film is unduly high and a relatively large amount of AITC infiltrates the AITC regenerating layer. They produce the antimicrobial action for an unduly long time and fail to use up the AITC wholly during the course of service when the permeability to steam is unduly low and the time for initiating the antimicrobial action is unduly long and the antimicrobial action is overrun by the growth of microbes.

In contrast thereto, the antimicrobial laminates which are set forth in the eleventh and 27th aspects allow the AITC to be released by gasification from the inclusion compound at a suitable speed and enable the inclusion compound to be utilized without waste because the permeability of the steam-pervious film to steam is confined within a prescribed range.

The antimicrobial laminate which is set forth in the fourteenth aspect has the substratal film provided with a gas barriering layer (having low permeability to gas). It precludes wasteful release of the AITC into the ambient air because the ambient air does not easily permeate the laminate toward the foodstuff contained therein and the steam in the ambient air mingles with the foodstuff only at a lower rate. Further, it exalts the ratio of utility of the inclusion compound because it precludes the dispersion of the AITC into the ambient air through the medium of the substratal film.

In the antimicrobial laminate which is set forth in the fifteenth aspect, the parts of minute pores in the steam-pervious film have a small wall thickness and allow the release by gasification of the AITC to proceed at a high speed as compared with the other parts. This antimicrobial laminate, therefore, can be adapted for the expected period of preservation of a given foodstuff by suitably setting the diameter and the number of the minute pores mentioned above.

When the antimicrobial laminate is used for wrapping a foodstuff having water drops adhering to the surface thereof, the entrance of water drops into the minute pores can be prevented and the quick release of the AITC can be avoided by sufficiently decreasing the diameter of the minute pores as compared with the size of water drops. Further, this laminate permits the speed of release of the AITC to be heightened as compared with the laminate which is not provided with minute pores.

In the antimicrobial laminate which is set forth in the eighteenth aspect, the antimicrobial action aimed at by the laminate is produced by the fact that the water from a foodstuff contained therein infiltrates the steam-pervious film which is a sealant material not containing the hygroscopic powder mentioned above. In this case, since the substratal film is provided with a gas barriering layer (having a small permeability to gas) and enabled to render difficult the passage of the ambient air therethrough toward the foodstuff side, the ratio of the steam in the ambient air to mingle with the foodstuff can be lowered and the wasteful release of the AITC can be prevented. Further, the ratio of utility of the inclusion compound can be increased because the possibility of the AITC being diffused in the ambient air through the medium of the substratal film is nil. The antimicrobial bag which is set forth in the ninteenth aspect is allowed to manifest the action originating in the antimicrobial laminate which is set forth in any of the tenth through eighteenth aspects. Since this bag is rendered openable and closable by means of a ridge-groove fastener provided at the mouth of the bag proper for insertion of a foodstuff, the foodstuff can be easily inserted into and extracted from the bag proper. It excels in the ability to retain the freshness of the foodstuff contained therein because it permits the user to remove part of the foodstuff from the bag proper and thereafter shield the remaining foodstuff in the bag proper against the ambient air by sealing the mouth of the bag proper with the fastener.

Further, since this antimicrobial bag is provided on the side thereof exposed to the open air with the steam-pervious substratal film, it induces neither spontaneous release by gasification of the AITC nor degradation of the antimicrobial action by aging even when the bag is left standing in its empty state in the open air. It manifests the antimicrobial action only when it contains a wet foodstuff.

The antimicrobial container which is set forth in the twentieth aspect is allowed to produce the action inherent in the antimicrobial laminate set forth in any of the tenth though eighteenth aspects. Then, it manifests a high ability to retain the freshness of a foodstuff similarly to the bag set forth in the ninteenth aspect because it is capable of shielding the interior thereof against the ambient air by means of a lid.

The antimicrobial shaped cups which are set forth in the 21st and 22nd aspects permit a foodstuff contained in the cup proper to be sealed by having the lid fused to the cup proper through the medium of a steam-pervious film such as of hotmelt adhesive resin or easy-peel resin.

The shaped cup which has been sealed as described above, therefore, produces the same action as is obtained by the antimicrobial container set forth in the twentieth aspect because the steam-pervious film falls on the side contacting the foodstuff and the steam-impervious substratal film on the side exposed to the open air.

Now, this invention will be described more specifically below with reference to working examples illustrated in the annexed drawings.

EXAMPLE 1

In an antimicrobial laminate 1 shown in FIG. 1, a K-PET substratal film 14 which is a steam-impervious film is formed by superposing a gas-barriering layer 13 which is a PVDC (polyvinylidene chloride) coating layer 3 μm in thickness on one side of a substratal film proper 12 which is a PET (polyethylene terephthalate) film 12 μm.

The antimicrobial laminate 1 is produced by adhesively superposing the substratal film 14 and a steam-pervious film 17 which is a LDPE (low density polyethylene) film 30 μm in thickness through the medium of an adhesive agent layer 16 containing a powder of an AITC inclusion cyclodextrin compound 15 (hereinafter referred to briefly as "inclusion compound 15"). Incidentally, the substratal film 14 is applied fast to the steam-pervious film 17 through the medium of the gas-barriering layer 13.

For the adhesive agent layer 16 mentioned above, any of the well-known adhesive agents generally used for joining synthetic resin materials can be used. For the purpose of enabling the produced laminate to manifest a stable function, it is desirable to use any of lamination grade adhesive agents excepting water-soluble adhesive agents.

In this example, therefore, a polyurethane-based two-component curing type dry laminate adhesive agent is used for the adhesive agent layer 16. This adhesive agent layer 16 has a thickness of 2.5 μm. The average particle diameter of the inclusion compound 15 is 1.0 μm and the amount of this compound to be incorporated in the adhesive agent layer 16 is 10 parts by weight, based on 100 parts by weight of the adhesive agent.

The steam-pervious film 17 mentioned above is desired to possess the permeability to steam (to be specifically mentioned hereinbelow) which is defined in the second aspect of this invention.

When the substratal film proper 12 to be used possesses a gas-barriering property, the superposition of the gas-barriering layer 13 may be omitted.

EXAMPLE 2

Figure 2:
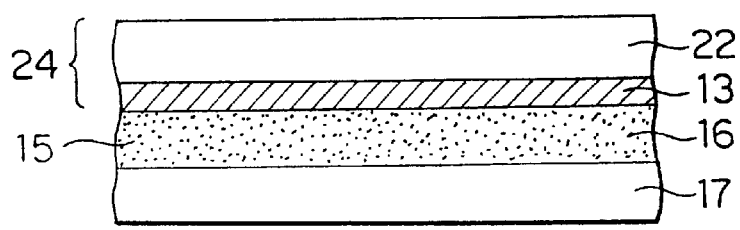
FIG. 2 is a schematic cross section showing a further example of the antimicrobial laminate of this invention.

In an antimicrobial laminate 2 shown in FIG. 2, A K-OPP substratal film 24 which is a steam-impervious film is obtained by disposing the gas-barriering layer 13 mentioned above on one side of a substratal film proper 22 which is an OPP (stretched polypropylene) film 20 μm in thickness.

Then, the antimicrobial laminate 2 is formed by adhesively superposing the substratal film 24 and the steam-pervious film 17 mentioned above through the medium of the adhesive agent layer 16 mentioned above.

Optionally, a polyamide film provided on one side thereof with the PVDC coating layer may be used in the place of the K-PET or K-OPP substratal film mentioned above.

EXAMPLE 3

Figure 3:
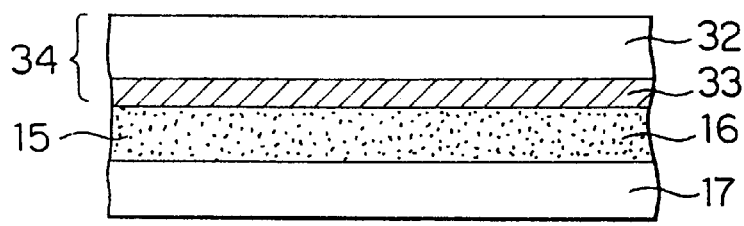
FIG. 3 is a schematic cross section showing another example of the antimicrobial laminate of this invention.

In an antimicrobial laminate 3 shown in FIG. 3, a substratal film 34 impervious to steam is formed by joining a gas-barriering layer 33 which is an aluminum foil 7 μm in thickness to one side of a substratal film proper 32 which is paper 50 μm in thickness through the medium of a vinyl acetate type emulsion adhesive agent.

The antimicrobial laminate 3 is obtained by adhesively superposing the substratal film 34 and a steam-pervious film 17 which is an easy-peel sealant film through the medium of the adhesive agent layer 16 mentioned above.

EXAMPLE 4

Figure 4:
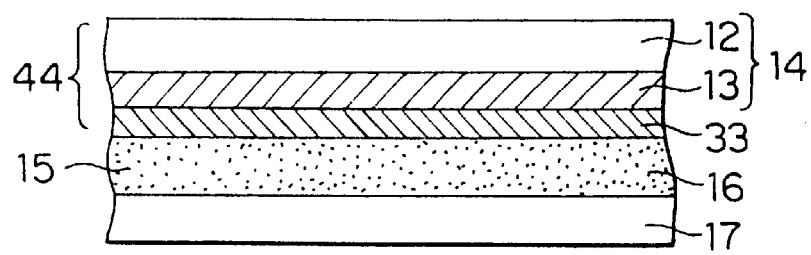
FIG. 4 is a schematic cross section showing yet another example of the antimicrobial laminate of this invention.

In an antimicrobial laminate 4 shown in FIG. 4, a steam-impervious substratal film 44 is formed by joining the substratal film 44 and the steam-pervious film 17 mentioned above through the medium of the adhesive agent layer 16 mentioned above.

EXAMPLE 5

Figure 5:
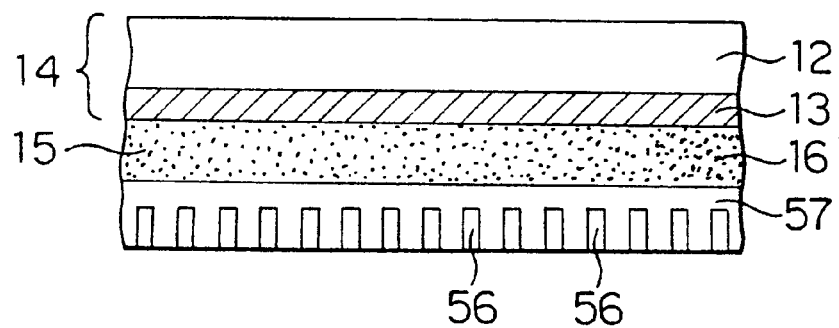
FIG. 5 is a schematic cross section showing still another example of the antimicrobial laminate of this invention.

An antimicrobial laminate 5 shown in FIG. 5 is produced by repeating the procedure of Example 1 while using a steam-pervious film 57 in the place of the steam-pervious film 17. In this steam-pervious film 57, minute pores 56 which are depression see FIG. 5 having a diameter of 5 μm are formed at a ratio in the range of from 50 to 5,000 pieces per cm by the electron discharge technique or the laser drill technique in the direction of thickness of the film to the middle part of the thickness from the surface.

In the presence of these minute pores 56, the amount of the AITC to be released by gasification per unit time is 1.3 to 3.0 times that which is obtained in the absence of the minute pores. The steam-pervious film or the sealant film mentioned above may be properly selected to suit the amount of the AITC to be released by gasification. It is particularly desired to possess a permeability to steam (JIS Z 0208) in the range of from 5 to 40 g/m$^2$·24 hr. As concrete examples of the film which answers the description, the following films may be cited.

(1) An LDPE film having a thickness in the range of from 20 to 40 μm.

(2) An MDPE (middle density polyethylene) film or a linear LDPE film having a thickness in the range of from 15 to 30 μm.

(3) An ethylene vinyl acetate copolymer film (vinyl acetate content 3 to 20%) or an ethylene methacrylic acid copolymer film having a thickness in the range of from 25 to 70 μm.

In the antimicrobial laminate of this invention, the substratal film is desired to be provided with a gas-barriering layer as in the example cited above. So long as the substratal film proper such as, for example, a PET film, an OPP film, or polyamide film is impervious to steam, the substratal film which is formed solely of this substratal film proper may be used instead. Otherwise, a laminate which is formed by suitably superposing paper and metallic foils (such as Al) may be used.

The antimicrobial laminate of the example cited above is a product of the superposition of a steam-impervious substratal film and a steam-pervious film through the medium of an adhesive agent layer containing the aforementioned inclusion compound. This adhesive agent layer may be substituted by an anchor coating layer containing the inclusion compound.

For example, an antimicrobial laminate can be formed by superposing an anchor coating layer formed of a urethane resin on the gas-barriering layer 13 of the substratal film 14 and contact superposing a freshly melt extruded LDPE film and the substratal film 14 (extrusion laminating technique).

In the place of the adhesive agent layer containing the inclusion compound mentioned above, a printed layer of an ink containing the inclusion compound may be superposed on the surface of an adhesive agent layer containing no inclusion compound or a printed layer of an ink containing the inclusion compound may be superposed on the surface of the aforementioned gas-barriering layer 13 or 33 (providing the adhesive agent may incorporate the inclusion compound therein or, when the printed layer covers the practically whole surface of the substratal film, the addition of the inclusion compound to the adhesive layer may be omitted). It is also permissible to have the printed layer superposed on the surface of the adhesive agent layer containing the inclusion compound.

In any event, the interposition of an intermediate layer containing the inclusion compound between a steam-impervious substratal film and a steam-pervious film is indispensable.

Though it is normal that the antimicrobial laminate of this invention be used in the form of a packaging bag proper, it is permissible to cut the laminate into pieces of a suitable size and use the pieces as contained in the packaging bags heretofore in popular use or as applied fast to the inner wall surfaces of containers of various shapes.

Further, the laminate which has deposited on one side of a steam-pervious film the adhesive agent layer containing the inclusion compound may be used as attached fast through the medium of the adhesive agent layer to the inner wall surface of a container of a varying shape. This arrangement is at an advantage in obviating the necessity for preparatorily applying an adhesive agent to the inner wall surface of the container.

Now, examples of the bag, container, and shaped cup using the antimicrobial laminate of this invention will be described hereinbelow with reference to the drawings annexed hereto.

EXAMPLE 6

Figure 6:
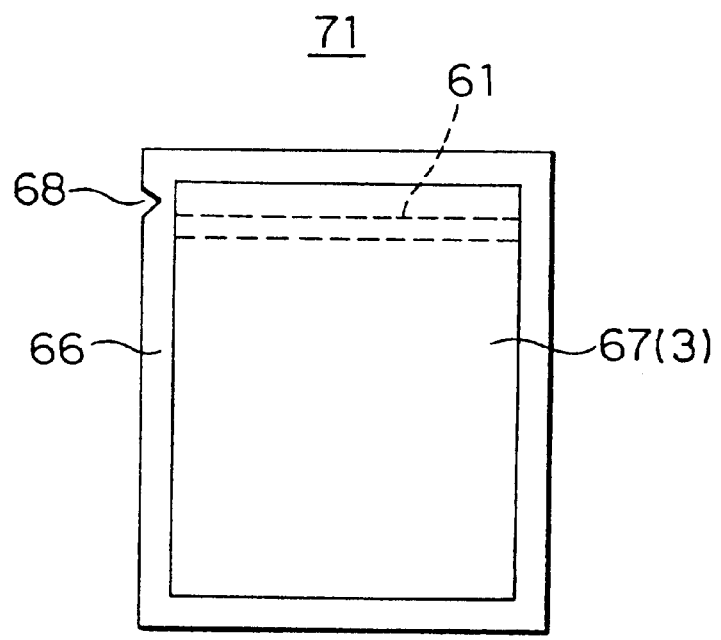
FIG. 6 is a schematic plan view showing an example of the antimicrobial bag of this invention.
Figure 7:
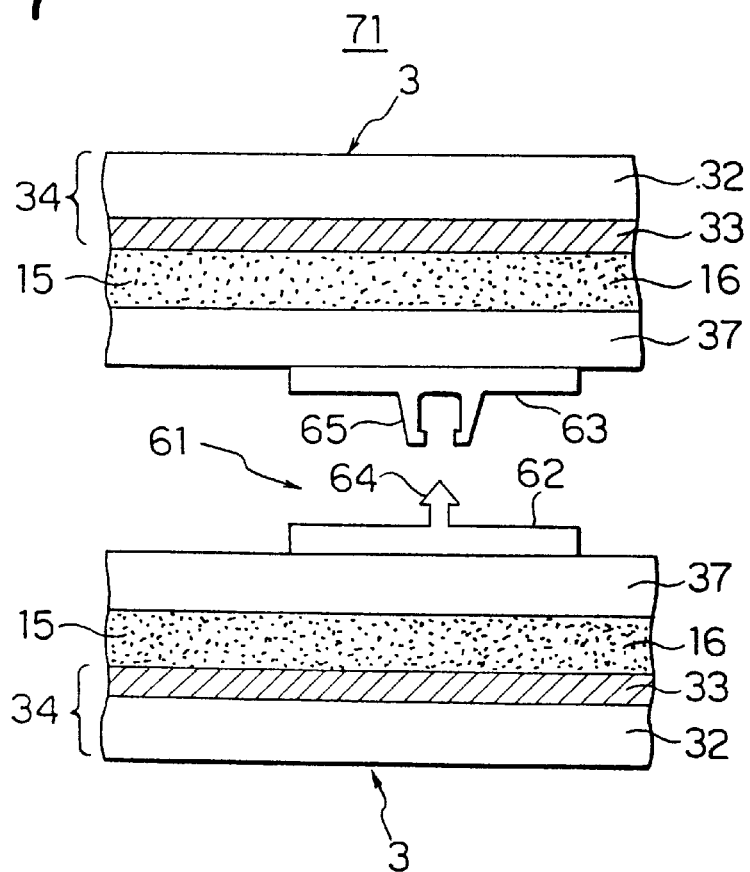
FIG. 7 is a magnified cross section showing the essential part of the antimicrobial bag of FIG. 6.

FIG. 6 is a plan view showing an antimicrobial bag 71 furnished with a fastener and FIG. 7 is a cross section showing the essential part of the bag 71.

As shown in FIG. 7, two rectangular pieces cut from the antimicrobial laminate 3 of Example 3 are prepared. One fastener piece 62 is disposed near the end part of a steam-pervious film (sealant film) 37 of one of the rectangular pieces of the antimicrobial laminate 3 parallelly to one edge thereof. Then, another fastener piece 63 joinable through a ridge-groove mesh to the fastener piece 62 is disposed on the steam-pervious film 37 of the other rectangular piece of the antimicrobial laminate 3 at a position corresponding to the position of the fastener 62 so as to complete a fastener 61 which is composed of the fastener pieces 62 and 63 as shown in FIGS. 6 and 7. In FIG. 7, 64 stands for a projected engaging piece and 65 for a depressed engaging piece.

In this case, the steam-pervious film 37 is made of an ethylene-methacrylic acid copolymer film, the fastener pieces 62 and 63 are made of such an olefin type polymer as LDPE, MDPE, or polypropylene, and the fastener pieces are attached by fusion to the laminate.

Then, the two rectangular pieces of the laminate are so superposed as to allow the projected and the depressed engaging piece 64 and 65 to be accurately opposed to each other and the peripheral edge parts of the rectangular pieces are heat-sealed to give rise to a rectangularly sealed edge 66 and form a bag proper 67 shown in FIG. 6. Further, a V-shaped notch 68 is formed in the part of the sealed edge 66 approximating the position at which the fastener 61 is disposed to complete the bag proper 71 furnished with a fastener.

In this example, since the sealed edge 66 mentioned above is formed by heat-sealing two pieces of an ethylene-methacrylic acid copolymer film, the two pieces are joined with high adhesive strength by the heat-sealing treatment performed at a relatively low temperature and consequently the work of forming the bag proper is carried out conveniently. Further, since the fastener 61 is joined by sealing to the ethylene-methacrylic acid copolymer film, this attachment of the fastener 61 can be carried out at a relatively low temperature quickly even when the fastener 61 is formed of an olefinic type polymer which is a popularly used synthetic resin material.

The bag proper 71 mentioned above can be used in the form of an empty bag or in the form already wrapping a foodstuff (such as, for example, perishable food) therein. In the latter case, the two rectangular pieces are made to wrap the foodstuff and then are heat-sealed to complete the bag proper 71.

Now, the method for using the bag proper 71 which has already wrapped a foodstuff and the function of this bag proper 71 will be described hereinbelow.

First, the end part of the bag proper 71 is removed by inserting a tear starting from the notch 68 and extending in the longitudinal direction thereof along the edge of the fastener 61. Then, the bag proper 71 is opened by breaking the engagement between the fastener pieces 62 and 63 to remove the foodstuff from the bag proper. Thereafter, the bag proper is sealed again by setting the fastener pieces 62 and 63 into engagement.

In this bag proper 71, the antimicrobial action can be stably maintained for a long time because the water from the foodstuff permeates the steam-pervious film 37 and infiltrates the adhesive agent layer 16 and, when the cyclodextrin of the inclusion compound is dissolved in the water, the AITC is regenerated and gradually gasified and released toward the foodstuff through the steam-pervious film 37. Further, since the bag proper 71 is provided on the side thereof opposite the side contacting the foodstuff with the steam-impervious substratal film 34 furnished with the gas-barriering layer 33, the possibility of the steam in the ambient air mingling with the foodstuff is remote and the possibility of the AITC undergoing excessive regeneration and diffusing in the ambient air via the substratal film is nil.

The bag proper 71, thus, affords an infallible and stable antimicrobial action, namely the action to retain the freshness of a foodstuff before it is opened by breaking the engagement of the fastener pieces 62 and 63 and after it is resealed as well.

EXAMPLE 7

Figure 8:
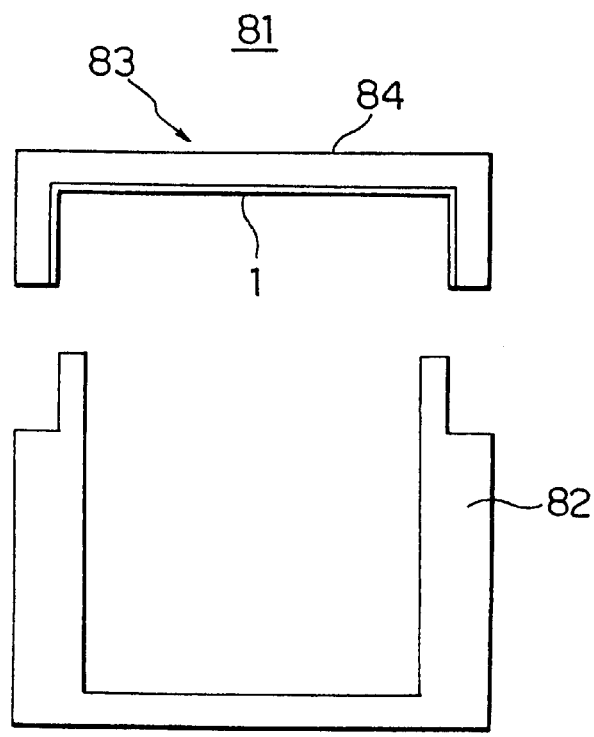
FIG. 8 is a schematic cross section showing an example of the antimicrobial container of this invention.

FIG. 8 is a schematic cross section of an antimicrobial container 81. This container 81 is composed of a container proper 82 made of synthetic resin, thick paper, or light metal which is impervious to steam and a lid 83 made of synthetic resin or the like and adapted to fit detachably into the container proper 82.

This lid 83 has the antimicrobial laminate 1 of Example 1 attached with the steam-pervious film 17 on the inner side to the inner side of a lid proper 84 through the medium of a polyolefin type hotmelt adhesive agent, for example.

Optionally, the antimicrobial laminate 1 may be additionally disposed on the inner side of the container proper 82 or, instead of using the antimicrobial laminate 1, the steam-pervious film 17 having provided on one side thereof with the adhesive agent layer 16 may be applied to the inner side of the lid proper 84 through the medium of the adhesive agent layer 16 (without specifically requiring use of an adhesive agent).

Now, a test example and a comparative example using the antimicrobial bag of this invention will be described below.

TEST EXAMPLE 1

As an antimicrobial bag proper, the bag proper 71 of FIG. 6 formed of the antimicrobial laminate 3 of Example 3 was used. The food storing part of this bag proper 71 measured 23 cm in length and 13 cm in width.

This antimicrobial bag proper was opened to place therein two commercially available cut pieces of rice cake, sealed, left standing in the open air at normal room temperature, and kept under visual observation meanwhile to determine the condition of growth of mold due to aging.

COMPARATIVE EXAMPLE 1

Two antimicrobial bags proper furnished with a fastener, i.e. (1) one made of a laminate of a K-PET film 12 µm in thickness and a polyethylene film 30 µm in thickness and (2) the other made solely of a polyethylene film (containing no inclusion compound) 50 µm in thickness, were used. These antimicrobial bags proper were identical in shape and size and in the construction of fastener to those used in Test Example 1.

These antimicrobial bags proper were opened to place therein two same commercially available cut pieces of rice cake as used in Test Example 1, sealed, left standing beside those bags of Test Example 1 and kept under observation meanwhile to determine the condition of growth of mold due to aging.

The results are shown in FIG. 9. Growth of mold started after two days of the test on the rice cake held in the bag proper of (1) and after three days of the test on the rice cake held in the bag proper of (2).

In contrast thereto, the bag proper of Text Example 1 showed no sign of discernible growth of mold after 10 days of the test. This fact indicates that the bag proper was effective in preventing the growth of mold.

EXAMPLE 8

Figure 10:
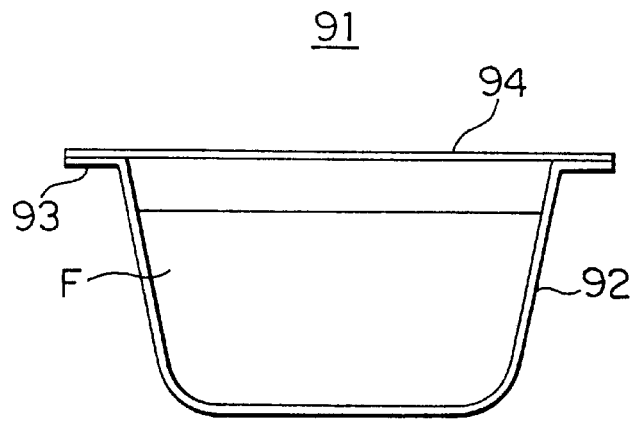
FIG. 10 is a schematic cross section showing an example of the antimicrobial shaped cup of this invention.

FIG. 10 is a schematic cross section of an antimicrobial shaped cup 91. This shaped cup 91 is a steam-impervious cup which comprises a cup proper 91 made mainly of plastics such as, for example, PET or PP/PVOH (polyvinyl alcohol)or EVOH/PP (laminate) and an easy-peel lid proper 94 to be fused to a flange part 93 of the cup proper 92.

Figure 11:
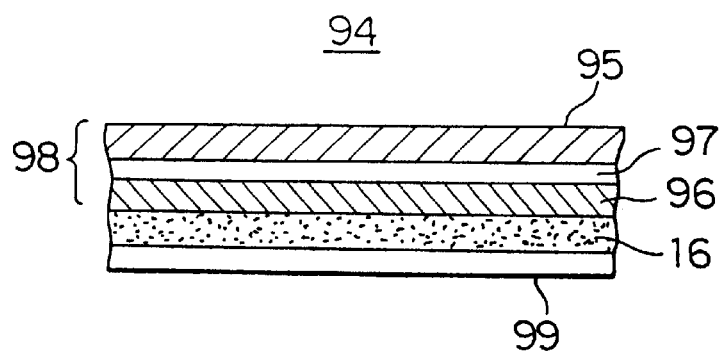
FIG. 11 is a magnified cross section showing part of the lid in the example of FIG. 10.

The lid proper 94 has such a cross-sectional construction as is shown in FIG. 11. A steam-impervious substratal film 98 is constructed by joining a gas-barriering layer 96 which is an aluminum foil 7 µm in thickness to one side of a substratal film proper 95 which is paper 50 µm in thickness through the medium of a vinyl acetate type emulsion adhesive agent 97. The easy-peel lid 94 made of the antimicrobial laminate is obtained by adhesively laminating the substratal film 98 and a steam-pervious film 99 formed of a hotmelt adhesive agent through the medium of the adhesive agent layer 16 mentioned above.

In this shaped cup 91, after a foodstuff F is placed in the cup proper, the lid proper 94 is fused to the flange part 93 through the medium of the steam-pervious film 99 which is an adhesive agent to seal the cup proper.

EXAMPLE 9

Figure 12:
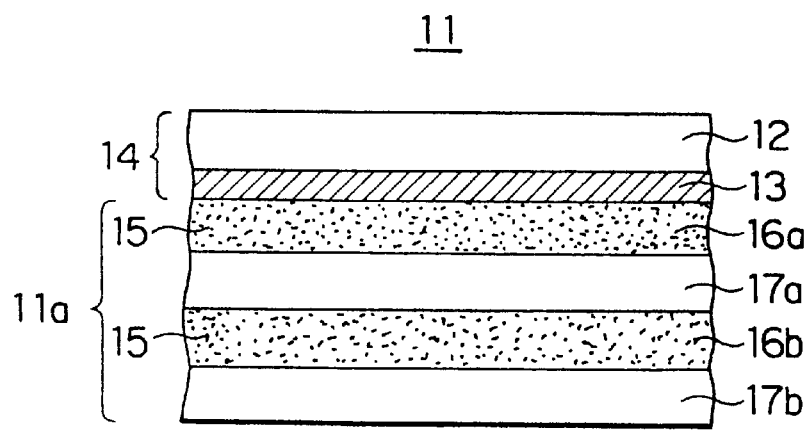
FIG. 12 is a schematic cross section showing an example of the antimicrobial laminate of this invention.

An antimicrobial laminate 11 shown in FIG. 12 comprises a substratal film 14 and an antimicrobial film 11a. The substratal film 14 is a steam-impervious film of K-PET and is constructed by depositing a gas-barriering layer 13 which is a PVDC (poly-vinylidene chloride) coating layer 3 µm in thickness on one side of a substratal film proper 12 which is a PET (polyethylene terephthalate) film 12 µm in thickness.

The antimicrobial film 11a is constructed by alternately superposing adhesive agent layers (AITC regenerating layers) 16a and 16b containing the powder 15 of an AITC inclusion cyclodextrin compound (hereinafter referred to as "inclusion compound 15") and steam-pervious films 17a and 17b which are made of a LDPE (low density polyethylene) film 30 µm in thickness.

Then, the antimicrobial laminate 11 is constructed by joining the antimicrobial film 11a to the gas-barriering layer 13 of the substratal film 14 through the medium of the adhesive agent layer 16a. In this laminate, the substratal film 14 and the outermost layer on the side opposite the substratal film 14 are each formed of the steam-pervious film 17b.

In the formation of the adhesive agent layers 16a and 16b mentioned above, any of the well-known adhesive agents to be used for mutually joining synthetic resin materials can be used. For the purpose of enabling the produced laminate to discharge its function stably, however, it is desirable to use any of laminate grade adhesive agents excepting aqueous solution type adhesive agents.

In this example, therefore, a polyurethane-based two-component curing type dry laminate adhesive agent is used for the adhesive agent layers 16a and 16b. These adhesive agent layers 16a and 16b have a thickness of 3.0±0.5 µm. The average particle diameter of the inclusion compound is 1.0 µm and the amount of the inclusion compound 15 to be added is 10 parts by weight, based on 100 parts by weight of the adhesive agent.

The steam-pervious film 17a and the sealant material 17b are desired to possess the permeability to steam which is defined in the eleventh aspect of this invention.

When the substratal film proper 12 is made of a substance possessing a gas-barriering property, the incorporation of the gas-barriering layer 13 in the laminate may be omitted.

In Example 9, the AITC regenerating layers are invariably made of an adhesive agent layer. An antimicrobial film may be otherwise constructed by superposing a steam-pervious film containing the inclusion compound and a steam-pervious film containing no inclusion compound through the medium of an adhesive agent layer exhibiting a steam-pervious property and containing no inclusion compound. This antimicrobial film acquires the same action and effect as the antimicrobial laminate of Example 9.

EXAMPLE 10

Figure 13:
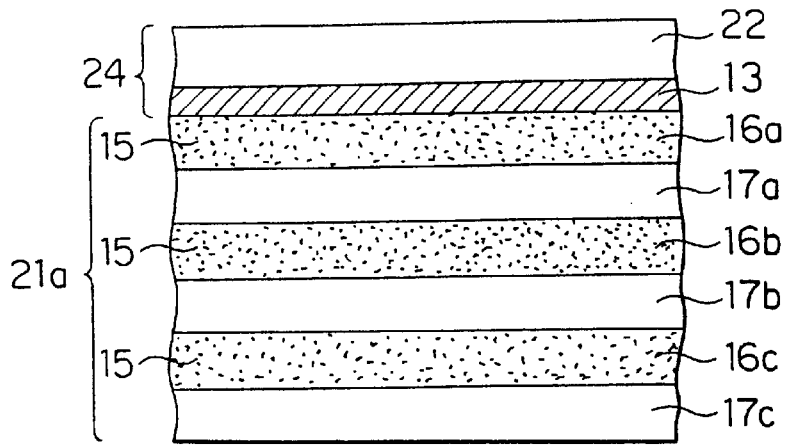
FIG. 13 is a schematic cross section showing a further example of the antimicrobial laminate of this invention.

In an antimicrobial laminate 21 shown in FIG. 13, a substratal film 24 of K-OPP which is a steam-impervious film is constructed by depositing the gas-barriering layer 13 mentioned above on one side of a substratal film proper 22 which is an OPP (stretched polypropylene) 20 µm in thickness.

An antimicrobial film 21a is constructed by alternately superposing adhesive agent layers (AITC regenerating layers) 16a, 16b, and 16c containing the inclusion compound 15 and steam-pervious films 17a, 17b, and 27c which are LDPE films 30 µm in thickness. Then, the antimicrobial laminate 21 is constructed by adhesively superposing the substratal film 24 and the antimicrobial film 21a on the gas-barriering layer 13 of the substratal film 24 through the medium of the adhesive agent layer 16a. In this laminate, the outermost layer on the side opposite the substratal film 24 is formed of the steam-pervious film 17c.

Incidentally, a polyamide film provided on one side thereof with a PVDC coating layer may be used in the place of the K-PET or K-OPP substratal film mentioned above.

EXAMPLE 11

Figure 14:
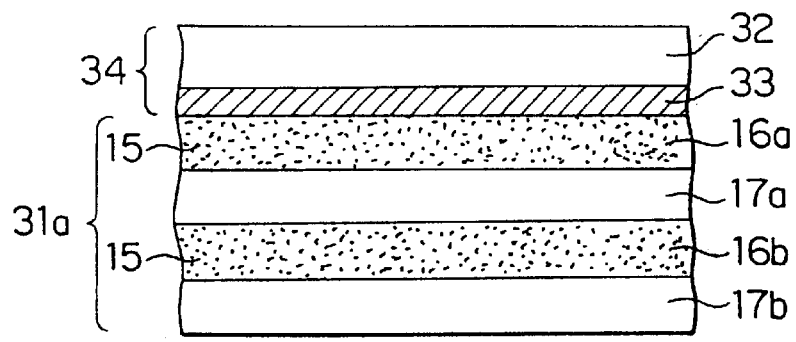
FIG. 14 is a schematic cross section showing another example of the antimicrobial laminate of this invention.

In an antimicrobial laminate 31 shown in FIG. 14, a steam-impervious substratal film 34 is constructed by joining a gas-barriering layer 33 which is an aluminum foil 7 μm in thickness to one side of a substratal film proper 32 which is paper 50 μm in thickness through the medium of a vinyl acetate type emulsion adhesive agent.

Then, the steam-pervious films 17a and 17b which are components of an antimicrobial film 31a are each made of an easy-peel sealant film. The antimicrobial laminate 31 is constructed by adhesively superposing the substratal film 34 and the antimicrobial film 31a on the gas-barriering layer 33 of the substratal film 34 through the medium of the adhesive agent layer 16a. The rest of the construction of the antimicrobial laminate 31 is identical to the construction of Example 9.

EXAMPLE 12

Figure 15:
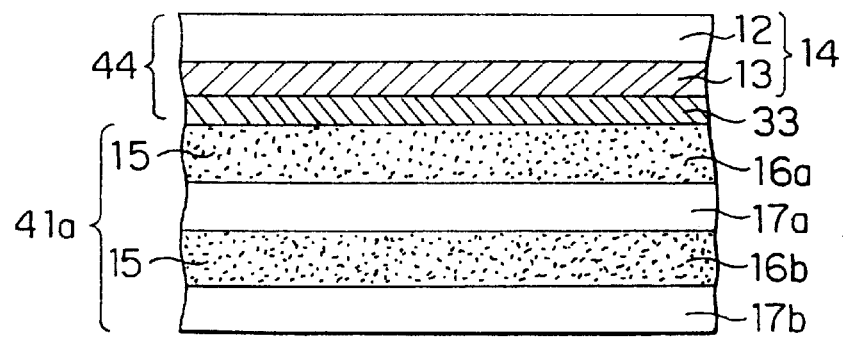
FIG. 15 is a schematic cross section showing yet another example of the antimicrobial laminate of this invention.

In an antimicrobial layer 41 shown in FIG. 15, a steam-impervious substratal film 44 is constructed by additionally joining the gas-barriering layer 33 mentioned above to one side of the gas-barriering layer 13 of the substratal film proper 14 mentioned above through the medium of a two-component curing type urethane type adhesive agent.

Then, the antimicrobial laminate 41 is constructed by adhesively superposing the substratal film 44 to an antimicrobial film identical in construction to the antimicrobial film 11a of Example 9 through the medium of the adhesive agent layer 16a.

EXAMPLE 13

Figure 16:
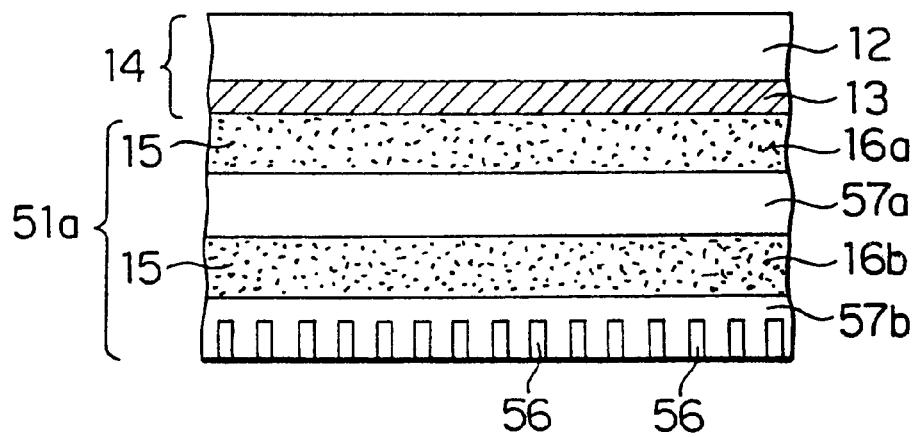
FIG. 16 is a schematic cross section showing still another example of the antimicrobial laminate of this invention.

An antimicrobial laminate 51 shown in FIG. 16 is constructed by adhesively superposing an antimicrobial film 51a on the substratal film 14 of Example 9. Specifically, an antimicrobial film 51a is provided on the side thereof closer to the substratal film 14 with the same steam-pervious film 57a as the steam-pervious film 17a of Example 9 and on the side farther from the substratal film 14 with a steam-pervious film 57b.

In this steam-pervious film 57b, minute pores 56 having a diameter of 5 μm are formed at a ratio in the range of from 50 to 5,000 pieces per cm$^2$ by the electron discharge technique or the laser drill technique in the direction of thickness of the film to the middle part of the thickness from the surface.

In the presence of these minute pores 56, the amount of the AITC to be released by gasification per unit time is 1.3 to 3.0 times that which is obtained in the absence of the minute pores.

The steam-pervious film or the sealant film mentioned above can be suitably selected so as to suit the amount of the AITC to be gasified and released. It is particularly desired to possess a permeability to steam (JIS Z 0208) in the range of from 5 to 40 g/m$^2$·24 hr.

As concrete examples of the steam-pervious film answering the description given above, the following films may be cited.

(1) A PET film 9 to 16 μm in thickness.
(2) A polyurethane film 1 to 20 μm in thickness.
(3) A chlorinated polypropylene film 1 to 10 μm in thickness.
(4) A vinyl chloride film 1 to 10 μm in thickness.
(5) A vinyl chloride type copolymer film 1 to 10 μm in thickness.
(6) An ethylene-vinyl acetate copolymer film 1 to 20 μm in thickness.

As concrete examples of the sealant film answering the description given above, the following films may be cited.

(1) An LDPE film 20 to 40 μm in thickness.
(2) An MDPE (middle density polyethylene) film or a linear LDPE film 15 to 30 μm in thickness.
(3) An ethylene-vinyl acetate copolymer film (vinyl chloride content 3 to 20%) or an ethylene-methacrylic acid copolymer film 25 to 70 μm in thickness.

In the antimicrobial laminate of this invention, it is particularly desirable that the substratal film be provided with such a gas-barriering layer as described in the preceding examples. The reason for the desirability of the gas-barriering layer is that this layer is useful not only for preventing the steam in the ambient air from permeating the substratal film and activating the AITC regenerating layer but also for enabling the generated AITC gas to manifest efficiently the antimicrobial action without escaping into the ambient air. As the substratal film, a product obtained by suitably superposing paper and metallic foil (such as aluminum) or a product obtained by suitably superposing a plastic material such as, for example, a PET film, a PP film, or a polyamide film on a metallic foil (such as, for example, aluminum) may be used.

Further, an anchor coating layer containing the inclusion compound mentioned above may be provided in the place of the adhesive agent layer mentioned above.

For example, an antimicrobial laminate can be formed by superposing an anchor coating layer formed of a urethane resin on the gas-barriering layer 13 of the substratal film 14 and contact superposing a freshly melt extruded LDPE film and the substratal film 14 (extrusion laminating technique).

Though it is normal that the antimicrobial laminate of this invention be used in the form of a packaging bag proper, it is permissible to cut the laminate into pieces of a suitable size and use the pieces as contained in the packaging bags proper heretofore in popular use or as applied fast to the inner wall surfaces of containers of various shapes through the medium of the substratal film such as, for example, a polyolefin type hotmelt adhesive agent.

Further, the laminate which has deposited on one side of a steam-pervious film the adhesive agent layer containing the inclusion compound mentioned above (specifically, the laminates of Examples 9 and 10 excluding the steam-pervious film on the outermost layer and consequently exposing the adhesive agent layers 16b and 16c) may be used as attached fast through the medium of the adhesive agent layer to the inner wall surface of a container of a varying shape. This arrangement is at an advantage in obviating the necessity for preparatorily applying an adhesive agent to the inner wall surface of the container.

EXAMPLE 14

Figure 23:
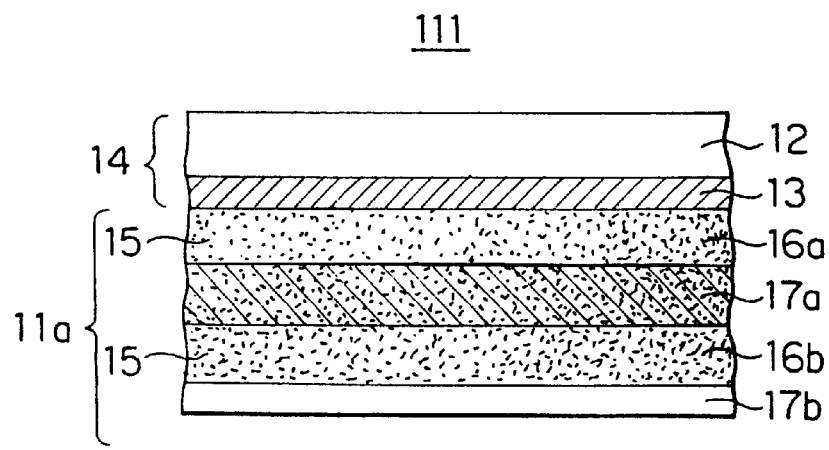
FIG. 23 is a schematic cross section showing another example of the antimicrobial laminate of this invention.

An antimicrobial laminate 111 shown in FIG. 23 comprises a substratal film 14 and an antimicrobial film 11a. The substratal film 14 is a steam-impervious film and is constructed by depositing a gas-barriering layer 13 which is a PVDC (poly-vinylidene chloride) coating layer 2 to 10 μm in thickness on one side of a substratal film proper 12 which is made of a PET (polyethylene terephthalate) film, a polyamide, or an OPP (stretched polypropylene) 12 to 30 μm in thickness.

The antimicrobial film 11a is constructed by sequentially superposing an adhesive agent layer (AITC regenerating layer) 16a having a thickness in the range of from 2 to 5 μm and containing a powder 15 of the AITC inclusion cyclodextrin compound (inclusion compound 15), a steam-pervious film 17a having a thickness in the range of from 2 to 10 μm and having a fine hygroscopic powder of silica gel or the like in an unwetted state uniformly dispersed in a resin such as polyester resin, polyamide resin, alkyd resin, or urethane resin, an adhesive agent layer (AITC regenerating layer) 16b having a thickness in the range of from 3 to 8 μm and containing the inclusion compound, and a sealant material 17b (containing no hygroscopic fine powder) which is a steam-pervious film having a thickness in the range of from 10 to 50 μm and made of PE (polyethylene), PP (polypropylene), or EVA (ethylene-vinyl acetate copolymer) in the order mentioned.

Then, the antimicrobial laminate 111 is constructed by joining the antimicrobial film 11a to the gas-barriering layer 13 of the substratal film 14 through the medium of the adhesive agent layer 16a. In this laminate, the outermost layer on the side opposite the substratal film 14 is formed of the sealant material 17b.

The hygroscopic fine powder mentioned above is desired to have an average particle diameter in the range of from 0.5 to 10 μm. If the average particle diameter is less than 0.5 μm, the powder will be too fine to be handled with ease and is liable to lose hygroscopicity. If it exceeds 10 μm, the powder will allow no easy gravure coating.

Then, the amount of the hygroscopic fine powder to be added is desired to be in the range of from 0.5 to 10 parts by weight, based on 100 parts by weight of the material which forms the steam-pervious layer. If this amount is less than 0.5 part by weight, the fine powder will not be expected to offer a required hygroscopic effect. If it exceeds 10 parts by weight, the produced laminate will suffer serious degradation of interlayer strength.

In the formation of the adhesive agent layers 16a and 16b mentioned above, any of the well-known adhesive agents which are used for mutual adhesion of synthetic resin materials can be used. For the purpose of enabling the produced laminate to manifest its function stably, it is desirable to use any of lamination grade adhesive agents excluding aqueous solution type adhesive agents.

For the adhesive agent layers 16a and 16b in the present example, therefore, a two-component curing type dry lamination adhesive agent based on polyurethane is used. The average particle diameter of the inclusion compound 15 is 1.0 μm and the amount of the inclusion compound 15 added is 10 parts by weight, based on 100 parts by weight of the adhesive agent mentioned above.

The steam-pervious film 17a and the sealant material 17b mentioned above are desired to possess the permeability to steam as defined in the seventeenth aspect of this invention.

When the substratal film proper 12 is made of a material possessing a gas-barriering property, the incorporation of the gas barriering layer 13 in the laminate may be omitted.

Example 14 under consideration has the AITC regenerating layer thereof formed solely of an adhesive agent layer. As an alternative, an antimicrobial film may be constructed by superposing layers of any of laminate grade adhesive agents excluding aqueous type adhesive agents one each on the upper and the lower side of a steam-pervious film containing the inclusion compound. This antimicrobial film acquires the same function and effect as that of Example 14.

EXAMPLE 15

Figure 24:
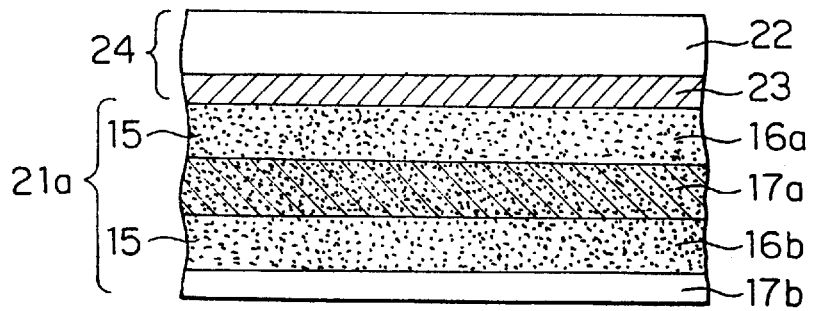
FIG. 24 is a schematic cross section showing yet another example of the antimicrobial laminate of this invention.

In an antimicrobial laminate 121 shown in FIG. 24, a steam-impervious substratal film 24 is constructed by joining a gas-barriering layer 23 which is an aluminum foil 7 μm in thickness to one side of a substratal film proper 22 which is paper 50 μm in thickness through the medium of a vinyl acetate type emulsion adhesive agent.

The steam-pervious film 17a and the sealant material 17b which form the antimicrobial film 21a are each made of an easy peel sealant film. The antimicrobial laminate 121 is constructed by adhesively superposing the substratal film 24 and the antimicrobial film 21a on the gas-barriering layer 23 of the substratal film 24 through the medium of the adhesive agent layer 16a. The rest of the construction is identical to the construction of Example 14.

Now, examples of the bags, containers, and shaped cups using the antimicrobial laminate of this invention will be described below with reference to the annexed drawings.

EXAMPLE 16

Figure 18:
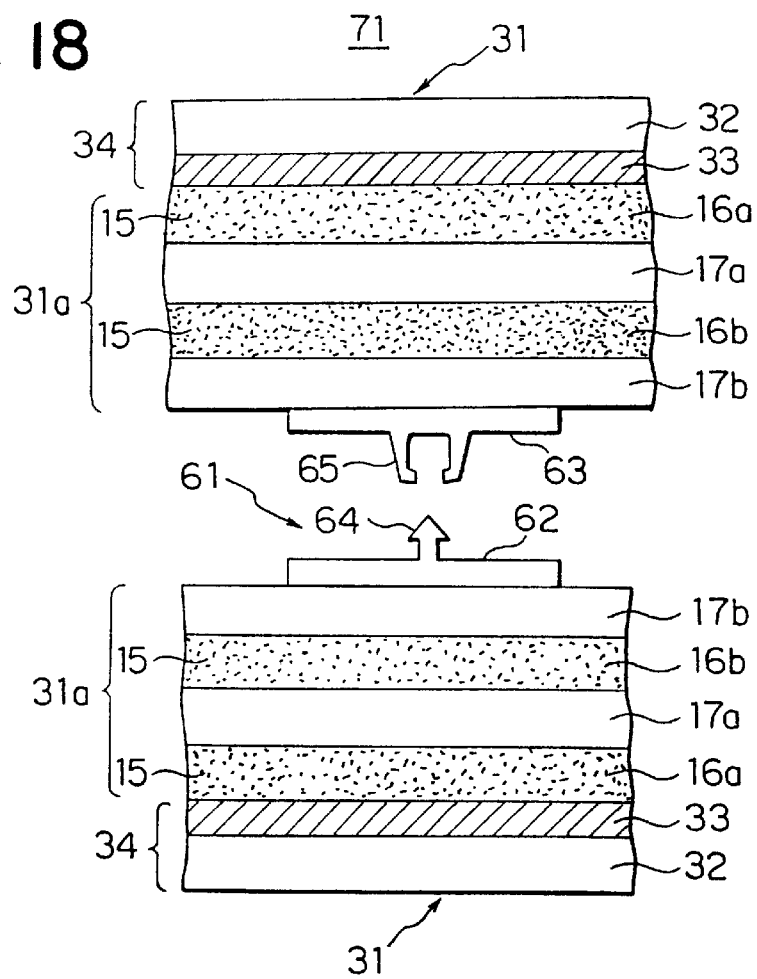
FIG. 18 is a magnified cross section showing the essential part of the example of FIG. 17.

FIG. 17 is a plan view of the antimicrobial bag proper 71 furnished with a fastener. FIG. 18 is a magnified cross section showing the essential part thereof.

As shown in FIG. 18, two rectangular pieces cut from the antimicrobial laminate 31 of Example 11 are prepared. One fastener piece 62 is disposed near the end part of a steam-pervious film (sealant film) 17b of one of the rectangular pieces of the antimicrobial laminate 31 parallelly to one edge thereof. Then, another fastener piece 63 joinable through a ridge-groove mesh to the fastener piece 62 is disposed on the steam-pervious film 17b of the other rectangular piece of the antimicrobial laminate 31 at a position corresponding to the position of the fastener 62 so as to complete a fastener 61 which is composed of the fastener pieces 62 and 63 as shown in FIGS. 17 and 18. In FIG. 18, 64 stands for a projected engaging piece and 65 for a depressed engaging piece.

In this case, the steam-pervious film 17b is made of an ethylene-methacrylic acid copolymer film, the fastener pieces 62 and 63 are made of such an olefin type polymer as LDPE, MDPE, or polypropylene, and the fastener pieces are attached by fusion to the laminate.

Then, the two rectangular pieces of the laminate are so superposed as to allow the projected and the depressed engaging piece 64 and 65 to be accurately opposed to each other and the peripheral edge parts of the rectangular pieces are heat-sealed to give rise to a rectangularly sealed edge 66 and form a bag proper 67 shown in FIG. 17. Further, a V-shaped notch 68 is formed in the part of the sealed edge 66 approximating the position at which the fastener 61 is disposed to complete the bag proper 71 furnished with a fastener.

In this example, since the sealed edge 66 mentioned above is formed by heat-sealing two pieces of an ethylene methacrylic acid copolymer film, the two pieces are joined with high adhesive strength by the heat-sealing treatment performed at a relatively low temperature and consequently the work of forming the bag proper is carried out conveniently. Further, since the fastener 61 is joined by seal-sealing to the ethylene-methacrylic acid copolymer film, this attachment of the fastener 61 can be carried out at a relatively low temperature quickly even when the fastener 61 is formed of an olefinic type polymer which is a popularly used synthetic resin material.

The bag proper 71 mentioned above can be used in the form of an empty bag or in the form already wrapping a foodstuff (such as, for example, perishable food) therein. In the latter case, the two rectangular pieces are made to wrap the foodstuff and then are heat-sealed to complete the bag proper 71.

Now, the method for using the bag proper 71 which has already wrapped a foodstuff and the function of this bag proper 71 will be described hereinbelow.

First, the end part of the bag proper 71 is removed by inserting a tear starting from the notch 68 and extending in the longitudinal direction thereof along the edge of the fastener 61. Then, the bag proper 71 is opened by breaking the engagement between the fastener pieces 62 and 63 to remove the foodstuff from the bag proper. Thereafter, the bag proper is sealed again by setting the fastener pieces 62 and 63 into engagement.

In this bag proper 71, the antimicrobial action can be stably maintained for a long time because the water from the foodstuff permeates the steam-pervious films 17b and 17a and infiltrates the adhesive agent layers 16b and 16a and, when the cyclodextrin of the inclusion compound 15 is dissolved in the water, the AITC is regenerated and gradually gasified and released toward the foodstuff through the steam-pervious film. Further, since the bag proper 71 is provided on the side thereof opposite the side contacting the foodstuff with the steam-impervious substratal film 34 furnished with the gas-barriering layer 33, the possibility of the steam in the ambient air mingling with the foodstuff is remote and the possibility of the AITC undergoing excessive regeneration and diffusing in the ambient air via the substratal film is nil.

The bag proper 71, thus, affords an infallible and stable antimicrobial action, namely the action to retain the freshness of a foodstuff before it is opened by breaking the engagement of the fastener pieces 62 and 63 and after it is resealed as well.

EXAMPLE 17

Figure 19:
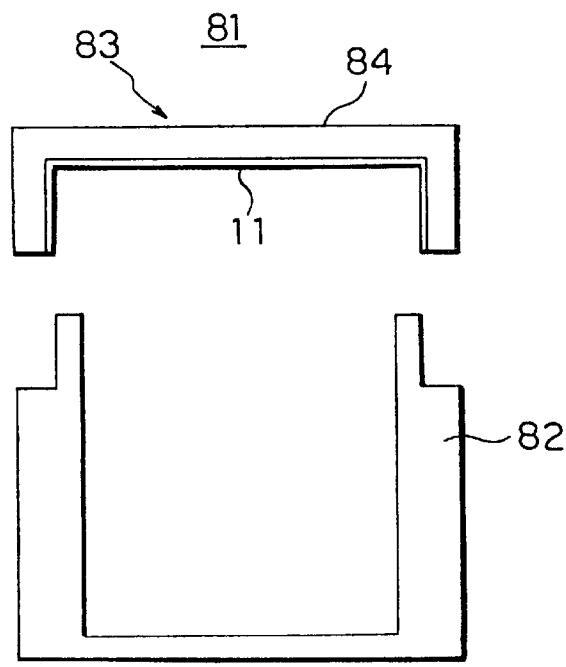
FIG. 19 is a schematic cross section showing an example of the antimicrobial container of this invention.

FIG. 19 is a schematic cross section of an antimicrobial container 81. This container 81 is composed of a container proper 82 made of a laminate of synthetic resin with thick paper or of light metal which is impervious to steam and a lid 83 made of synthetic resin or the like and adapted to fit detachably into the container proper 82.

This lid 83 has the antimicrobial laminate 11 of Example 1 attached with the outermost layer of steam-pervious film 17b on the inner side to the inner side of a lid proper 84 through the medium of a polyolefin type hotmelt adhesive agent, for example.

Optionally, the antimicrobial laminate 11 may be additionally disposed on the inner side of the container proper 82 or, instead of using the antimicrobial laminate 11, the outermost layer of steam-pervious film 17b having superposed thereon the adhesive agent layer containing the inclusion compound may be applied to the inner side of the lid proper 84 through the medium of the adhesive agent layer (without specifically requiring use of an adhesive agent).

Now, a test example and comparative examples using the antimicrobial bag proper of Example 16 will be described below.

TEST EXAMPLE 2

As an antimicrobial bag proper, a bag proper 71 of FIG. 17 made of the antimicrobial laminate 31 of Example 11 was used. In this case, the inclusion compound was added in an equal amount to the adhesive agent layers 16a and 16b and the food containing part measured 23 cm in length and 13 cm in width.

This antimicrobial bag proper was opened to place therein two commercially available cut pieces of rice cake, sealed, left standing in the open air at normal room temperature, and kept under visual observation meanwhile to determine the condition of growth of mold due to aging.

COMPARATIVE EXAMPLE 2

As an antimicrobial bag proper, a bag proper identical in shape with the bag proper 71 shown in FIG. 17 and made of the antimicrobial laminate which was provided solely with the AITC regenerating layer 16a, namely the antimicrobial laminate of FIG. 4 minus the adhesive agent layer 16b and the steam-pervious film 17b, was used. The amount of the inclusion compound added to the adhesive agent layer 16 was equal to the total amount of the inclusion compound added to the adhesive agent layers 16a and 16b of the antimicrobial laminate 31 used in Test Example 2. This antimicrobial bag proper was identical in shape and size and in the construction of fastener with that of Test Example 2.

This antimicrobial bag proper was opened to place therein two commercially available cut pieces of rice cake, sealed, left standing together with the bag proper of Test Example 2 likewise containing cut pieces of rice cake, and kept under visual observation meanwhile for the determination of the condition of growth of mold due to aging.

COMPARATIVE EXAMPLE 3

Two antimicrobial bags proper furnished with a fastener, i.e. (1) one made of a laminate (containing no inclusion compound) of a K-PET film 12 $\mu$m in thickness and a polyethylene film 30 $\mu$m in thickness and (2) the other made solely of a polyethylene film (containing no inclusion compound) 50 $\mu$m in thickness, were used. These antimicrobial bags proper were identical in shape and size and in the construction of fastener to those used in Test Example 2.

These antimicrobial bags proper were opened to place therein two same commercially available cut pieces of rice cake as used in Test Example 2, sealed, left standing together with those bags of Test Example 2 and Comparative Example 2 and kept under observation meanwhile to determine the condition of growth of mold due to aging.

The results are shown in FIG. 20. Growth of mold started after two days of the test on the rice cake held in the bag proper of (1) of Comparative Example 3 and after three days of the test on the rice cake held in the bag proper of (2).

In contrast thereto, the bag proper of Comparative Example 2 showed no sign of discernible growth of mold after 10 days of the test. This fact indicates that the bag proper was effective in preventing the growth of mold. Bags proper containing cut pieces of rice cake were similarly tested under various conceivable temperature and humidity conditions. As a result, they were found to retain the antimicrobial action for periods of from 15 to 30 days.

Further, the bag proper of Test Example 2 showed no sign of discernible growth of mold even after 45 days of the test. The duration of the antimicrobial action of the bag proper of Test Example 2 was 45 to 60 days as compared with that of the bag proper of Comparative Example 2 which was 15 to 30 days. This fact indicates that the bag proper preeminently excels in the ability to effect gradual release of the AITC.

EXAMPLE 18

Figure 21:
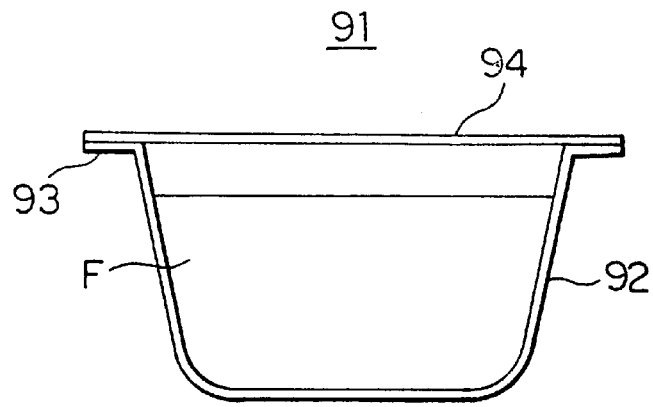
FIG. 21 is a schematic cross section showing an example of the antimicrobial shaped cup of this invention.

FIG. 21 is a schematic cross section of an antimicrobial shaped cup 91. This shaped cup 91 is a steam-impervious cup which comprises a cup proper 91 made mainly of plastics such as, for example, PET or PP/PVOH (polyvinyl alcohol) or EVOH/PP (laminate) and an easy-peel lid proper 94 to be fused to a flange part 93 of the cup proper 92.

Figure 22:
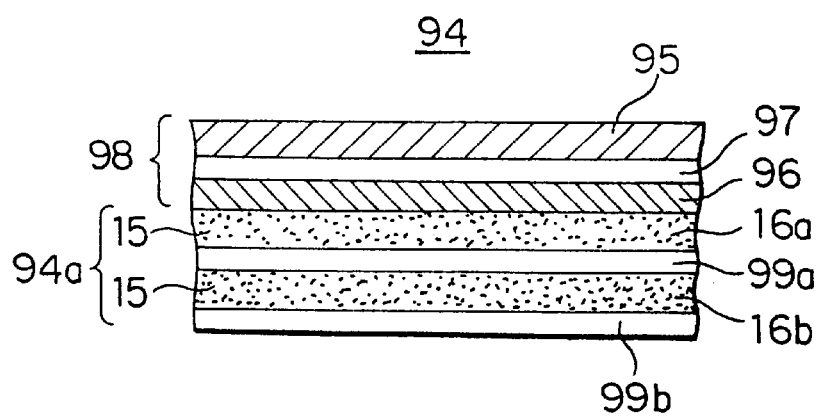
FIG. 22 is a magnified cross section showing part of the lid in the example of FIG. 21.

The lid proper 94 has such a cross-sectional construction as is shown in FIG. 22. A steam-impervious substratal film 98 is constructed by joining a gas-barriering layer 96 which is an aluminum foil 7 μm in thickness to one side of a substratal film proper 95 which is paper 50 μm in thickness through the medium of a vinyl acetate type emulsion adhesive agent 97.

An antimicrobial film 94a is constructed by sequentially superposing a steam-pervious film 99a, an adhesive agent layer 16a, a steam-pervious film 99b, and an adhesive agent layer 16b in the order mentioned with the aid of a hotmelt adhesive agent. The easy-peel lid 94 made of the antimicrobial laminate is obtained by adhesively superposing this antimicrobial film 94a on the substratal film 98 through the medium of the adhesive agent layer 16a.

In this shaped cup 91, after a foodstuff F is placed in the cup proper, the lid proper 94 is fused to the flange part 93 through the medium of the steam-pervious film 99 which is an adhesive agent to seal the cup proper.

EXAMPLE 19

Figure 25:
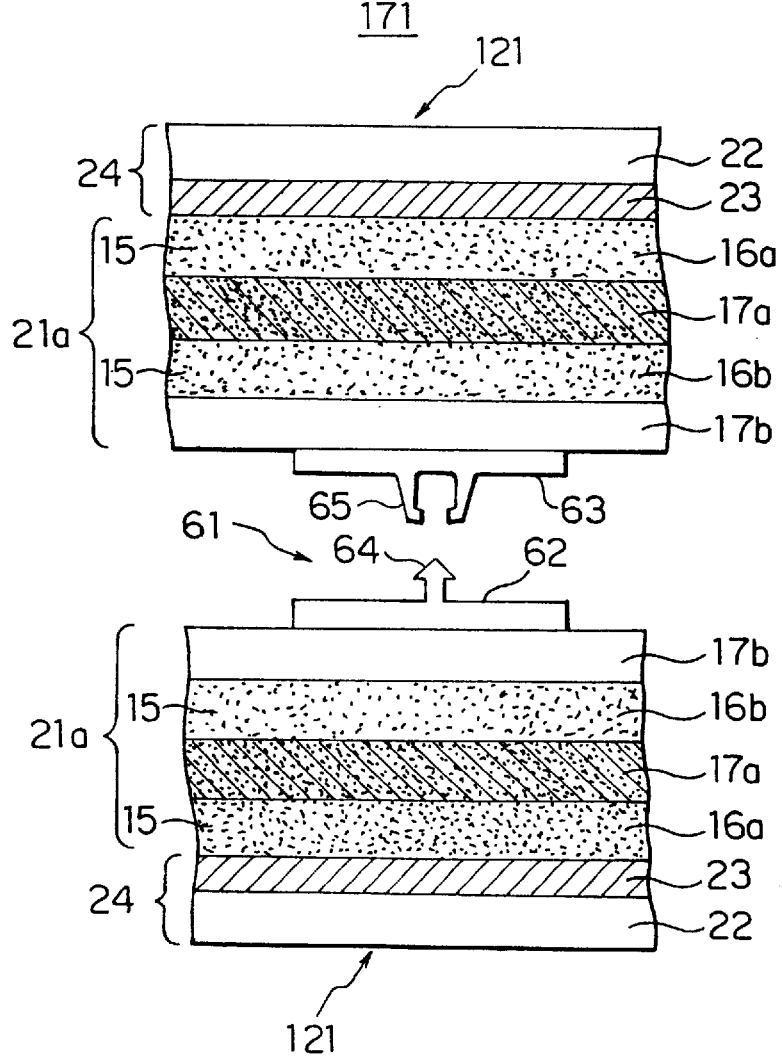
FIG. 25 is a magnified cross section showing the essential part of another example of the antimicrobial bag of this invention.
Figure 26:
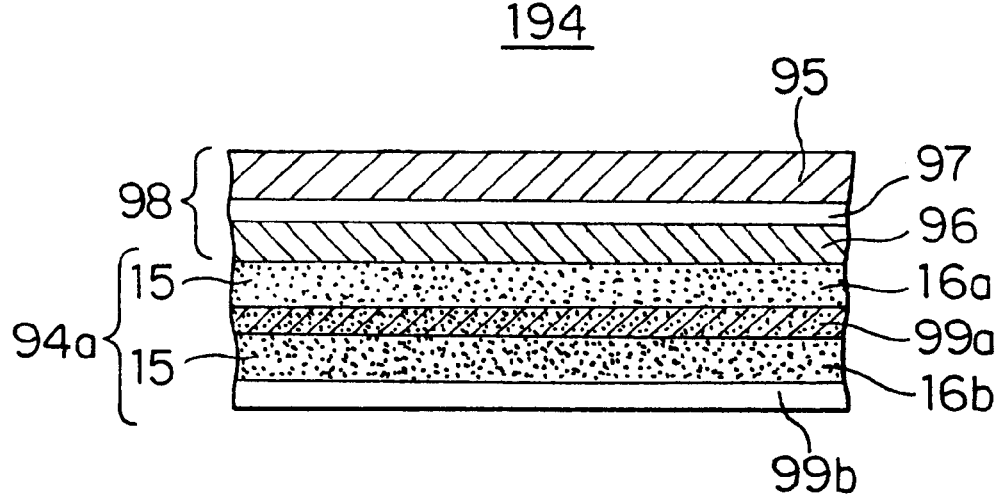
FIG. 26 is a magnified cross section showing part of the lid in another example of the antimicrobial shaped cup of this invention.

FIG. 25 is a magnified cross section showing the essential part of an antimicrobial bag 171 furnished with a fastener. This bag 171 uses the antimicrobial laminate 121 of FIG. 24 in the place of the antimicrobial laminate 31 of FIG. 14. The rest of the construction and therefore the use of use of the bag are identical with those of the antimicrobial bag 71 shown in FIGS. 17 and 18.

EXAMPLE 20

This invention allows use of an antimicrobial laminate 111 shown in FIG. 23, for example, in the place of the antimicrobial laminate 11 in the antimicrobial container 81 shown in FIG. 19. In this case, the lid 83 similarly to that of the example of FIG. 19 has the aforementioned antimicrobial laminate 111 applied with the outermost layer of sealant material 17b thereof facing the inner side of the container 81 to the inner side of the lid proper 84 through the medium of a polyolefin-based hotmelt type adhesive agent, for example.

Now, a test example and comparative examples using the antimicrobial bag of Example 19 (FIG. 25) will be described below.

TEST EXAMPLE 3

As an antimicrobial bag, the bag made of the antimicrobial laminate 121 of Example 15 in the same shape as the bag shown in FIG. 17 was used. In this case, the average particle diameter of a fine silica gel powder added to the steam-pervious film 17a was 5 μm, the amount of the powder added was 5.0 parts by weight, based on 100 parts by weight of the material used for the formation of the film, the inclusion compound was added in an equal amount to the adhesive agent layers 16a and 16b, and the food containing part measured 23 cm in length and 13 cm in width.

This antimicrobial bag proper was opened to place therein two commercially available cut pieces of rice cake, sealed, left standing in the open air at normal room temperature, and kept under visual observation meanwhile to determine the condition of growth of mold due to aging.

Comparative Example 4

Figure 27:
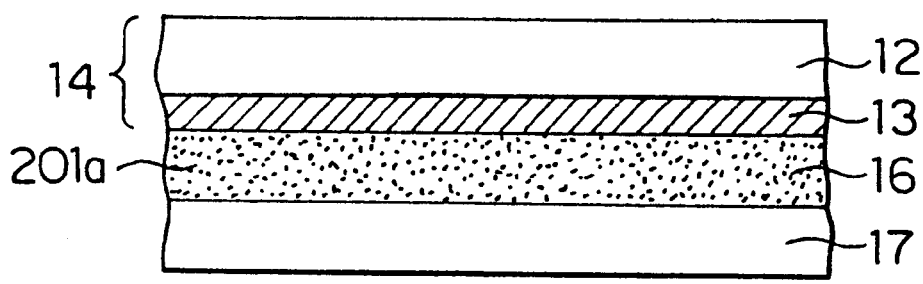
FIG. 27 is a schematic cross section of an antimicrobial laminate of which the antimicrobial bag of Comparative Example 4 is formed.
Figure 28:
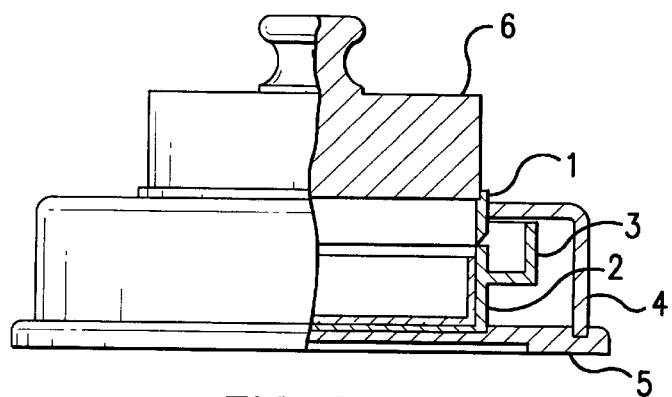
FIG. 28 shows the apparatus used in the JIS Z 0208 test procedure.
Figures 1, 29:
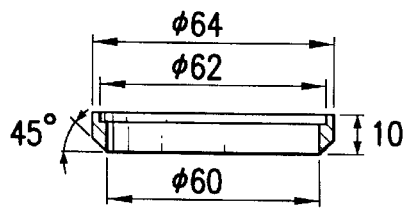
FIG. 29 (1)–(6) show details of the test apparatus components used in JIS Z 0208.
Figures 2, 29:
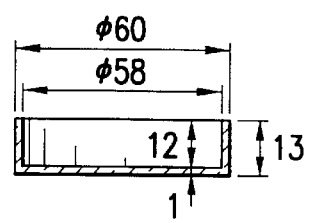
Figures 3, 29:
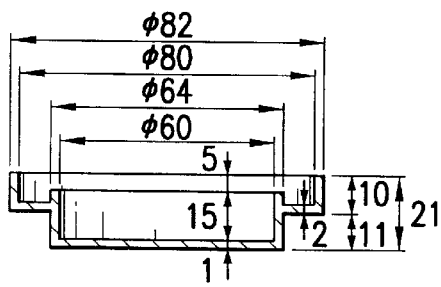
Figures 4, 29:
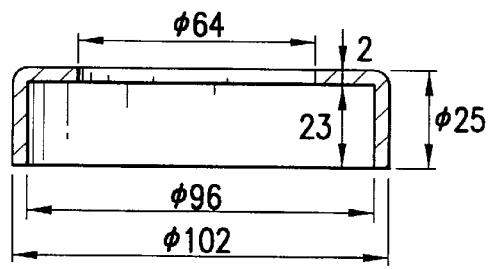
Figures 5, 29:
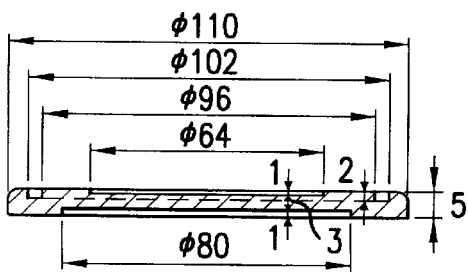
Figures 6, 29:
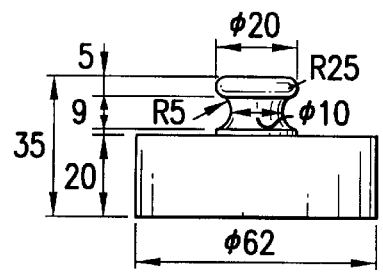

As an antimicrobial bag, the bag made in the same shape as the bag shown in FIG. 17 by using an antimicrobial laminate 201 whose cross-sectional construction is shown in FIG. 27 was used. The antimicrobial laminate 201 mentioned above was constructed by adhesively superposing the substratal film 14 consisting of the substratal film proper 12 and the gas-barriering layer 13 and an antimicrobial film 201a consisting of the AITC regenerating layer (adhesive layer) 16 containing no fine silica gel powder and the steam-pervious film 17.

In the antimicrobial laminate 201, the amount of the inclusion compound added to the adhesive agent layer 16 was equal to the total amount of the inclusion compound added to the adhesive agent layers 16a and 16b of the antimicrobial laminate 121 used in Test Example 3. This antimicrobial bag proper was identical in shape and size and in the construction of fastener with that of Test Example 3.

This antimicrobial bag proper was opened to place therein two same commercially available cut pieces of rice cake as used in Test Example 3, sealed, left standing together with the bag of Test Example 3, and kept under observation meanwhile to determine the condition of growth of mold due to aging.

Comparative Example 5

Two antimicrobial bags proper furnished with a fastener, i.e. (1) one made of a laminate (containing no inclusion compound) of a K-PET film 12 μm in thickness and a polyetylene film 30 μm in thickness and (2) the other made solely of a polyethylene film (containing no inclusion compound) 50 μm in thickness, were used. These antimicrobial bags proper were identical in shape and size and in the construction of fastener to those used in Test Example 3.

These antimicrobial bags proper were opened to place therein two same commercially available cut pieces of rice cake as used in Test Example 2, sealed, left standing together with those bags of Test Example 3 and Comparative Example 4 and kept under observation meanwhile to determine the condition of growth of mold due to aging.

As a result, growth of mold started after two days of the test on the rice cake held in the bag proper of (1) of Comparative Example 5 and after three days of the test on the rice cake held in the bag proper of (2).

In contrast thereto, the bag proper of Comparative Example 4 showed no sign of discernible growth of mold after 10 days of the test. This fact indicates that the bag proper was effective in preventing the growth of mold. Bags proper containing cut pieces of rice cake were similarly tested under various conceivable temperature and humidity conditions. As a result, they were found to retain the antimicrobial action for periods of from one to two weeks.

Further, the bag proper of Test Example 3 showed no sign of growth of mold even after 60 days of the test. The duration of the antimicrobial action was elongated to a period in the range of from 75 to 90 days. This fact clearly indicates that this bag proper excelled in the ability to effect gradual release of the AITC.

EXAMPLE 21

This invention allows use of a lid proper 194 shown in FIG. 16 in the place of the lid proper 94 of the antimicrobial container 91 shown in FIG. 21. In this lid proper 194, the steam-impervious substratal film 98 is constructed by joining the gas-barriering layer 96 which is an aluminum foil 7 μm in thickness to one side of the substratal film proper 95 50 μm in thickness through the medium of a vinyl acetate type emulsion adhesive agent 97.

An antimicrobial film 94a is constructed by sequentially superposing an adhesive agent layer 16a, a steam-pervious film 99a containing a hygroscopic powder, an adhesive agent layer 16b, and a sealant material 99b made of a hot melt adhesive agent in the order mentioned. The easy-peel lid 94 made of the antimicrobial laminate is obtained by adhesively superposing this antimicrobial film 94a on the substratal film 98 through the medium of the adhesive agent layer 16a.

In the shaped cup (not shown) provided with this lid proper 194 similarly to the shaped cup 91, after a foodstuff F is placed in the cup proper, the lid proper 194 is fused to the flange part of the cup proper through the medium of a sealant material 99b. As is clearly noted from the description given above, the antimicrobial laminates which are set forth in the first, second, and third aspects are used with the steam-pervious film sides thereof facing the sides thereof containing a foodstuff and they produce the antimicrobial action stably for a long time because the water from a foodstuff permeates the steam-pervious film and then infiltrates the intermediate layer and the AITC consequently generated in a gasified state from the inclusion compound gradually diffuses toward the foodstuff side via the steam-pervious film. Since they are provided on the side opposite the side for containing a foodstuff with a steam-impervious substratal film, they suffer neither excessive regeneration of the AITC nor wasteful release thereof, excel in the ability to effect gradual release of the AITC, and utilize the antimicrobial action of the AITC to advantage.

The antimicrobial laminate which is set forth in the second aspect allows the AITC to be gasified from the inclusion compound and then released at a proper speed and ensures economic use of the inclusion compound because the permeability of the steam-pervious film to steam is set within a prescribed range.

In the antimicrobial laminate which is set forth in the fifth aspect of this invention, since the substratal film is provided with a gas-barriering layer to render difficult the passage of the ambient air toward the foodstuff side, the ratio at which the steam in the ambient air enters the foodstuff side is lowered and the function of keeping the freshness of a foodstuff is exalted. Further, the ratio of effective utility of the inclusion compound is heightened because the diffusion of the AITC into the ambient air is prevented.

The antimicrobial laminate which is set forth in the sixth aspect of this invention is enabled to release the AITC at a speed fit for such factors as the duration of preservation of a foodstuff by properly endowing the steam-pervious film with minute pores of a suitable diameter.

The antimicrobial bag which is set forth in the seventh aspect of this invention produces the effect which is inherent in the antimicrobial laminate set forth in any of the first through sixth aspect of this invention. The bag allows convenient insertion and removal of a foodstuff because it is rendered openable and closable with a fastener of ridge-groove engagement. After part of the foodstuff is removed from the bag and the rest of the foodstuff is resealed in the bag, the ability of the bag to keep the freshness of the remaining foodstuff is improved because the fastener shields the interior of the bag from the ambient air. Even when this antimicrobial bag in its empty state is left standing in the open air, the antimicrobial ability thereof is not degraded by aging.

The antimicrobial container which is set forth in the eight aspect of this invention produces the effect which is inherent in the antimicrobial laminate set forth in any of the first through sixth aspect of this invention. This container is effective in heightening the ability to keep the freshness of a foodstuff similarly to the bag of the seventh aspect because the lid shields the container interior from the ambient air.

In the antimicrobial shaped cup which is set forth in the ninth aspect of this invention, the same effect as is obtained by the antimicrobial container set forth in the eighth aspect of this invention is produced because the vapor-pervious film falls on the side containing a foodstuff in the shaped cup in its sealed state and the steam-impervious substratal film falls on the side exposed to the ambient air.

The antimicrobial laminate, antimicrobial bag, antimicrobial container, and antimicrobial shaped cup according to the present invention produce no antimicrobial action (and preclude wasteful consumption of the inclusion compound) while they are not holding a water-containing foodstuff. After they have contained the perishable water-containing foodstuff, they enable the foodstuff to keep their freshness stably for a long time by making full use of the inclusion compound. These outstanding properties adapt them for wrapping articles to be used in refrigerators.

The antimicrobial laminate which is set forth in the tenth aspect of this invention is used with the side thereof opposite the substratal film, namely the steam-pervious film side thereof, facing the side exposed to a foodstuff or other article being contained therein. It can manifest the antimicrobial action thereof stably for a long time because the water from the foodstuff permeates the steam-pervious film and infiltrates the AITC regenerating layer and the AITC regenerated in a gasified state from the inclusion compound gradually diffuses toward the foodstuff side through the steam-pervious film. Since this antimicrobial laminate is provided on the side opposite the side containing the foodstuff with a steam-impervious substratal film, it entrains no wasteful release of the AITC due to excessive regeneration, excels in the ability to effect gradual release of the AITC, and brings about the effect of utilizing the antimicrobial action of the AITC to advantage.

Particularly, it preeminently excels in the ability to effect gradual release of the AITC because two or more AITC regenerating layers are formed by alternately superposing AITC regenerating layers and steam-pervious films and, as a result, the part for mainly regenerating the AITC gradually shifts from the side closer to the foodstuff to the side farther therefrom. For the fixed amount of the inclusion compound to be used, for example, the antimicrobial laminate of the present invention has a long duration of the antimicrobial action as compared with an antimicrobial laminate provided with one AITC regenerating layer. The antimicrobial laminate which is set forth in the eleventh aspect of this invention allows the AITC to be released in a gasified state at a proper speed from the inclusion compound and permits the inclusion compound to be consumed economically because the permeability of the steam-pervious film to steam is set within a prescribed range.

With the antimicrobial laminate which is set forth in the fourteenth aspect of this invention, the ratio at which the steam in the ambient air mingles into the foodstuff side is lowered and the ability to keep the freshness of the foodstuff is heightened because the substratal film is furnished with a gas-barriering layer to render difficult the passage of the ambient air toward the foodstuff side. Further, this antimicrobial laminate enjoys a highly economic utility of the inclusion compound because it precludes the diffusion of the AITC in the ambient air.

The antimicrobial laminate which is set forth in the fifteeth aspect of this invention is enabled to release the AITC at a speed fit for such factors as the period of storage of a foodstuff because the steam-pervious film is provided with a suitable number of minute pores of a suitable diameter.

The antimicrobial laminate which is set forth in the sixteenth aspect of this invention is used with the side opposite the substratal film facing the side exposed to a foodstuff or the like being contained. It is capable of manifesting the antimicrobial action stably for a long time because it incorporates therein a steam-pervious film (the layer for adjusting the permeation of humidity) which has a hygroscopic powder dispersed therein.

Since the water emanating from the foodstuff (or the like) preferentially infiltrates that of the two AITC regenerating layers which is farther from the substratal film and the excess of infiltrating water is absorbed in the hygroscopic powder such as silica gel, practically no water infiltrates the remaining AITC regenerating layer which is closer to the substratal film. The antimicrobial action during the first half period, therefore, is produced by the fact that the AITC regenerated from the inclusion compound in the AITC regenerating layer farther from the substratal film is made to infiltrate the AITC regenerating layer in the reverse direction and is gradually released in a gasified state toward the foodstuff.

After the amount of the AITC regenerated from the AITC regenerating layer has declined and consequently the ability of the hygroscopic powder to absorb moisture had decreased, the water from the foodstuff begins to infiltrate the AITC regenerating layer closer to the subsratal film and the AITC regeneration begins to proceed.

For the fixed amount of the inclusion compound to be used, the antimicrobial laminate of this invention offers a notably long duration of the antimicrobial action as compared with an antimicrobial laminate which is provided with one AITC regenerating layer having no hygroscopic powder dispersed therein.

The antimicrobial laminate which is set forth in the sixteenth aspect of this invention entrains no wasteful release of the regenerated AITC and enjoys the effect of utilizing the antimicrobial action of the AITC to advantage because it is provided on the side opposite the side for containing a foodstuff with a steam-impervious substratal film.

The antimicrobial laminate which is set forth in the seventeenth aspect of this invention enables the AITC to be released in a gasified state from the inclusion compound at a proper speed and allows economic use of the inclusion compound because the permeability of the steam-pervious film to steam is set within a prescribed range.

In the antimicrobial laminate which is set forth in the eighteenth aspect of this invention, the rate at which the steam in the ambient air mingles in the foodstuff side is low and the ability to keep the freshness of the foodstuff is high because the substratal film is provided with a gas-barriering layer to render difficult the passage of the ambient air toward the foodstuff side. This antimicrobial laminate enjoys highly economic utility of the inclusion compound because it precludes diffusion of the AITC into the ambient air.

The antimicrobial bag which is set forth in the niteenth aspect of this invention acquires the effect inherent in the antimicrobial laminate set forth in any of the tenth to eighteenth aspects of this invention. The bag allows convenient insertion and removal of a foodstuff because it is rendered openable and closable with a fastener of ridge-groove engagement. After part of the foodstuff is removed from the bag and the rest of the foodstuff is resealed in the bag, the ability of the bag to keep the freshness of the remaining foodstuff is improved because the fastener shields the interior of the bag from the ambient air. Even when this antimicrobial bag in its empty state is left standing in the open air, the antimicrobial ability thereof is not degraded by aging.

The antimicrobial container which is set forth in the twentieth aspect of this invention acquires the effect inherent in the antimicrobial laminate set forth in any of the tenth through eighteenth aspect of this invention. This antimicrobial container, similarly to the bag of the ninteenth aspect of this invention, enjoys the effect of heightening the ability to keep the freshness of the foodstuff because it is capable of shielding the container interior from the ambient air by means of the lid.

The antimicrobial laminate, antimicrobial bag, antimicrobial container, and antimicrobial shaped cup according to the present invention produce no antimicrobial action (and preclude wasteful consumption of the inclusion compound) while they are not holding a water-containing foodstuff. After they have contained the perishable water-containing foodstuff, they enable the foodstuff to keep their freshness stably for a long time by making full use of the inclusion compound. These outstanding properties adapt them for wrapping articles to be used in refrigerators.

While there have been shown and described preferred embodiments of the invention, it is to be distinctly understood that the invention is not limited thereto but may be otherwise variously embodied and practiced within the scope of the following claims.

What is claimed is:

1. An antimicrobial laminate characterized by having a substratal film impervious to steam and a film pervious to steam superposed through the medium of an intermediate layer containing an allylisothiocyanate (AITC) inclusion cyclodextrin compound wherein said film pervious to steam possesses permeability to steam (JIS {Japanese Industrial Standard} Z 0208) in the range of from 5 to 40 $4/m^2 \cdot 24$ hr;

wherein said film pervious to steam consists of numerous minute depressions formed therein in a thickness direction of said film to the middle part of the film in said thickness direction from a surface and not extending through said film in said thickness direction.

2. The antimicrobial laminate according to claim 1, wherein said intermediate layer is an adhesive agent layer containing an AITC inclusion cyclodextrin compound.

3. The antimicrobial laminate according to claim 1, wherein said substratal film is provided on one side thereof with a gas-barriering layer and said intermediate layer is interposed between said gas-barriering layer and said film pervious to steam.

4. An antimicrobial laminate characterized by having superposed a substratal film impervious to steam and an antimicrobial film provided with an allylisothiocyanate (AITC) regenerating layer containing an AITC inclusion cyclodextrin compound and said antimicrobial film being formed by alternately superposing AITC regenerating layers and films pervious to steam and consequently provided with two or more AITC regenerating layers, wherein said permeability to steam of said steam-pervious film (JIS {Japanese Industrial Standard} Z 0208) is in the range of from 5 to 40 $g/m^2 \cdot 24$ hr, and wherein said film pervious to steam superposed in the outermost layer on the side opposite said substratal film consists of numerous minute depressions formed therein in a thickness direction of said film to the middle part of the film in said thickness direction from a surface and not extending through said film in said thickness direction.

5. The antimicrobial laminate according to claim 4, wherein the outermost layer on the side opposite said substratal film is formed of said steam-pervious film and all the AITC regenerating layers are each formed of an adhesive agent layer containing an AITC inclusion cyclodextrin compound.

6. The antimicrobial laminate according to claim 4, wherein said substratal film is provided on one side thereof with a gas-barriering layer and said AITC regenerating layer is interposed between said gas-barriering layer and said film pervious to steam.

7. An antimicrobial laminate characterized by having superposed a substratal film impervious to steam and an antimicrobial film provided with an allylisothiocyanate (AITC) regenerating layer containing an AITC inclusion cyclodextrin compound and said antimicrobial film being formed by interposing between two vertically opposed AITC regenerating layers a steam-pervious film having a hygroscopic powder dispersed therein, and wherein said film pervious to steam superposed in the outermost layer on the side opposite said substatal film consists of numerous minute depressions formed therein in a thickness direction of said film to the middle part of the film in said thickness direction from a surface and not extending through said film in said thickness direction.

8. The antimicrobial laminate according to claim 7 wherein said permeability to steam of said steam-pervious film (JIS Z 0208) is in the range of from 5 to 40 g/m$^2$·24 hr.

9. The antimicrobial laminate according to claim 7, wherein said substratal film is provided on one side thereof with a gas barrier layer, said AITC regenerating layer is used as an adhesive layer, said antimicrobial film is formed by sequentially superposing an AITC regenerating layer, a steam-pervious film having a hygroscopic powder dispersed therein, an AITC regenerating layer, and a steam-pervious film containing no hygroscopic powder in the order mentioned, and said gas barriering layer of said substratal film and said AITC regenerating layer of said antimicrobial film are superposed.

* * * * *